(12) United States Patent
Ikeya

(10) Patent No.: US 12,049,957 B2
(45) Date of Patent: Jul. 30, 2024

(54) TRANSMISSION AND MESHING CLUTCH

(71) Applicant: IKEYA FORMULA CO., LTD., Kanuma (JP)

(72) Inventor: Shinji Ikeya, Kanuma (JP)

(73) Assignee: Ikeya Formula Co., Ltd., Tochigi (JP)

( * ) Notice: Subject to any disclaimer, the term of this patent is extended or adjusted under 35 U.S.C. 154(b) by 285 days.

(21) Appl. No.: 17/616,777

(22) PCT Filed: Mar. 19, 2020

(86) PCT No.: PCT/JP2020/012245
§ 371 (c)(1),
(2) Date: Dec. 6, 2021

(87) PCT Pub. No.: WO2020/250535
PCT Pub. Date: Dec. 17, 2020

(65) Prior Publication Data
US 2022/0341492 A1 Oct. 27, 2022

(30) Foreign Application Priority Data
Jun. 8, 2019 (JP) .................................. 2019-117861

(51) Int. Cl.
*F16H 63/30* (2006.01)
*F16H 3/08* (2006.01)
*F16H 61/04* (2006.01)

(52) U.S. Cl.
CPC .............. *F16H 63/30* (2013.01); *F16H 3/08* (2013.01); *F16H 61/04* (2013.01);
(Continued)

(58) Field of Classification Search
CPC .... F16H 63/30; F16H 2063/3093; F16H 3/08; F16H 2003/0811; F16H 2003/0822; F16H 61/04; F16H 2061/0474; F16H 2200/0052
See application file for complete search history.

(56) References Cited

U.S. PATENT DOCUMENTS 2,369,843 A * 2/1945 Neracher ............ F16D 23/0612
192/53.33
3,780,840 A 12/1973 Thomas
(Continued)

FOREIGN PATENT DOCUMENTS

DE 102 34 318 A1 2/2003
GB 2184177 A 6/1987
(Continued)

OTHER PUBLICATIONS

Motor Fan illustrated (corresponding page of a magazine cited in the priority Japanese Application).

*Primary Examiner* — Huan Le
(74) *Attorney, Agent, or Firm* — Norris McLaughlin, P.A.

(57) ABSTRACT

A transmission comprises a moving mechanism to generate axial force to move the one rotary member and releases the axial force according to generation of coasting torque, an urging mechanism to urge the one rotary member with force being poorer than the axial force being generated by the moving mechanism so that the meshing teeth mesh, the contact body of the urging mechanism arranged in a supporting hole formed on the torque transmission member in a radial direction, and an urging and converting part provided to receive the contact body being urged in the radial direction by the urging functional part and convert a direction of the urging to the axial direction to urge the axial movement of the one rotary member.

9 Claims, 12 Drawing Sheets

(52) U.S. Cl.
CPC ............... *F16H 2003/0811* (2013.01); *F16H 2003/0822* (2013.01); *F16H 2061/0474* (2013.01); *F16H 2063/3093* (2013.01); *F16H 2200/0052* (2013.01)

(56) References Cited

U.S. PATENT DOCUMENTS

| | | | |
|---|---|---|---|
| 5,022,506 A | | 6/1991 | Philippe |
| 11,078,967 B2 | * | 8/2021 | Yanagida ............. F16H 63/304 |

FOREIGN PATENT DOCUMENTS

| | | |
|---|---|---|
| JP | 37-28816 Y1 | 10/1962 |
| JP | 2-236040 A | 9/1990 |
| JP | 9-264336 A | 10/1997 |
| JP | 2015-140892 A | 8/2015 |
| JP | 2018-76905 A | 5/2018 |
| WO | 2018/010715 A1 | 1/2018 |

* cited by examiner

FIG.2
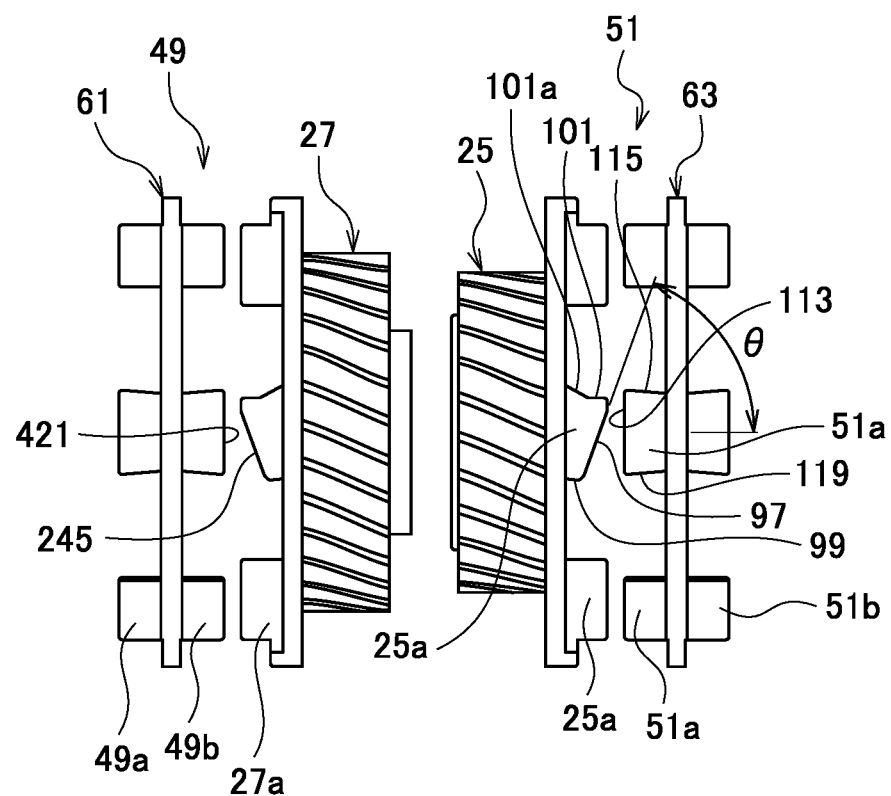
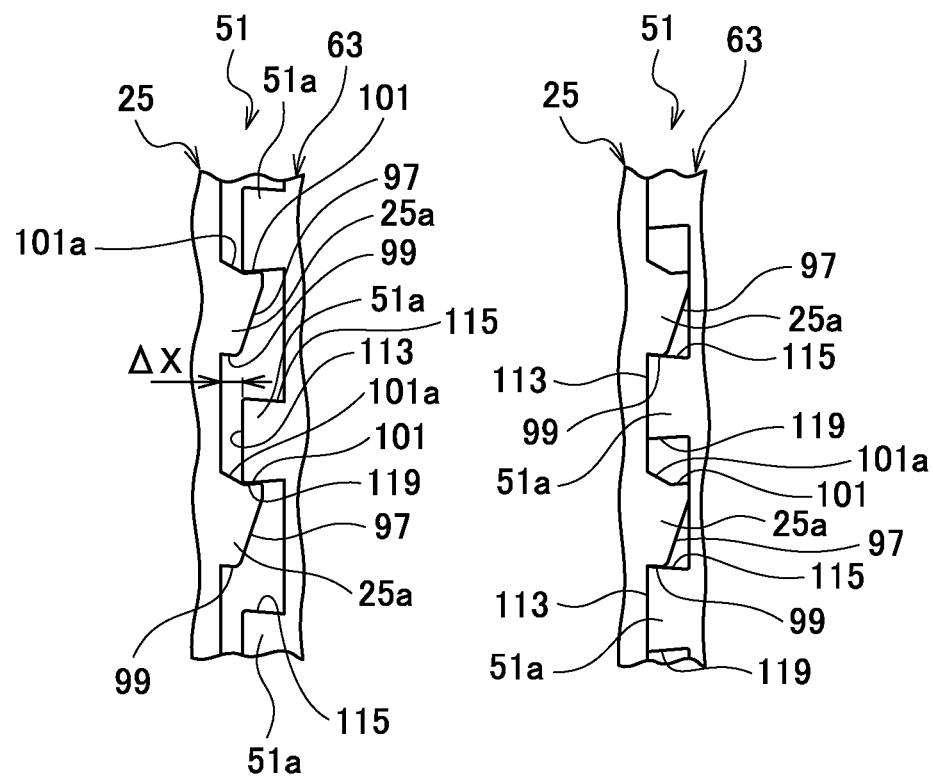
FIG.3( A )   FIG.3( B )

FIG.11( A )
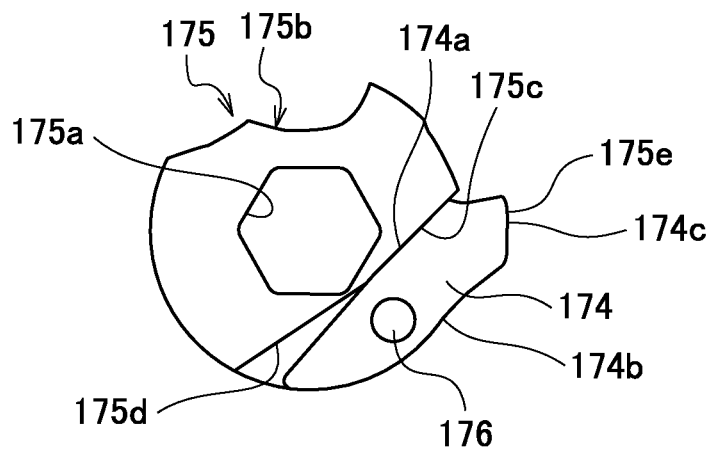
FIG.11( B )
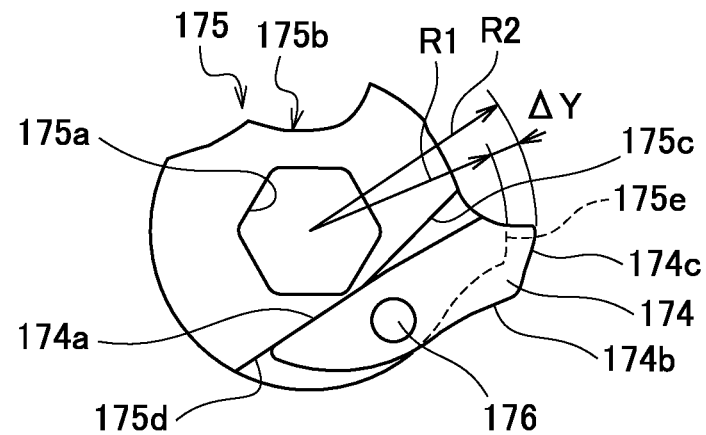

TRANSMISSION AND MESHING CLUTCH

FIELD OF THE INVENTION

The present invention relates to a transmission and a meshing clutch to conduct shifting of an automobile, a construction machine, an agriculture vehicle or the like.

RELATED ART

Generally, a transmission for a vehicle using a single clutch inevitably involves shift shock, delay in acceleration and the like due to interruption of driving force at the time of shifting. In addition, in a construction machine, an agriculture vehicle or the like with large running resistance and small speed energy, it becomes stopped as soon as the driving force is interrupted at the time of shifting and may cause a situation hard to be shifted.

On the other hand, it is known that a twin-clutch transmission involves no interruption of driving force to suppress shift shock and delay in acceleration.

There is, however, a problem that the twin-clutch transmission is complicated in structure and heavy in weight.

In contrast, a seamless-shift transmission using meshing teeth is considered as one being capable of suppress weight increase.

The applicant of the present application further improved a transmission of this kind in shift shock to propose as Patent Document 1.

This transmission is provided with a plurality of shift gears, a plurality of clutch sleeves and a shift mechanism. The shift gears are supported with a torque transmission shaft so as to be relatively rotatable. The clutch sleeves are to selectively connect the shift gears to the torque transmission shaft to perform transmission output, and can selectively mesh with the shift gears using meshing teeth. The shift mechanism is to selectively operate the clutch sleeves according to accelerating work and the like.

Then, when the clutch sleeves of a lower stage and an upper stage perform simultaneously-meshing according to shift-up operation or shift-down operation of the shift mechanism, for example, driving torque is generated on the clutch sleeve of the upper stage and coasting torque is generated on the clutch sleeve of the lower stage to perform shifting so as to act axial force in a meshing-releasing direction on the clutch sleeve of the lower stage.

The clutch sleeves and the shift gears of the transmission are provided with meshing teeth that mesh in a rotational direction for torque transmission, and the meshing teeth have guide faces to generate the axial force in the meshing-releasing direction with operation of slopes according to the coasting torque.

The meshing of the clutch sleeve of the lower stage or the upper stage is, therefore, surely released according to the torque acting on the slope, and the shift shock is reduced.

The guide faces are, however, formed on faces of the meshing teeth in the rotational direction side and accordingly inclination of the slopes is never made smaller, and it is in a situation that internal circulation torque is considerably increased due to the simultaneously meshing when, for example, the meshing of the lower shift stage is released.

Accordingly, there is a problem that, when disengaging the meshing teeth, the shift shock and noise are greatly remained since the meshing faces are pressed to each other, are relatively shifted in the disengaging direction according to the increased internal circulation torque and are finally instantaneously disengaged at ends of the meshing teeth to release the internal circulation torque.

PATENT DOCUMENT 1 JP 2015-140892 A

SUMMARY OF INVENTION

A problem to be solved by the invention is that shock and noise are remained when releasing a meshing clutch.

A transmission according to the present invention, in order to reduce shock and noise remained when releasing a meshing clutch, is provided with a meshing clutch that connects one shift stage with meshing and is released when changing connection to another shift stage through simultaneously meshing, wherein the meshing clutch is provided with meshing teeth on one side and on another side to perform the meshing, a meshing tooth on the one side is provided on one rotary member being axially movable to perform torque transmission at said one shift stage, and a meshing tooth on the other side is provided on another rotary member to perform the torque transmission between said one rotary member and said other rotary member, the meshing tooth on said other side with which the meshing tooth on said one side meshes due to axial movement of said one rotary member, a releasing-guide part inclined is provided at a tooth top of any one of the meshing teeth on said one side and on said other side to bring a tooth top of a counterpart into contact with the releasing-guide part according to relative rotation to guide the releasing, a moving mechanism generates axial force to move said one rotary member to an axial position at which the contact according to the relative rotation is allowed when the meshing teeth mesh to perform transmission of driving torque, and the moving mechanism releases the axial force according to generation of coasting torque, said one rotary member engages with a torque transmission member in a rotational direction and is axially movably supported with the torque transmission member, said other rotary member is relatively rotatably supported and is axially unmovably supported with the torque transmission member, an urging mechanism is provided to be arranged between said one rotary member and the torque transmission member to urge said one rotary member with force being poorer than the axial force being generated by the moving mechanism so that the meshing teeth mesh due to that said one rotary member moves from a neutral position to said other rotary member, the urging mechanism is provided with a contact body and an urging functional part, the contact body is arranged in a supporting hole formed on the torque transmission member in a radial direction and is urged by the urging functional part toward an inner periphery of said one rotary member, and the inner periphery of said one rotary member is provided with an urging and converting part that receives the contact body being urged by the urging functional part in the radial direction and converts a direction of the urging to an axial direction to urge the axial movement of said one rotary member and connect said one rotary member to the torque transmission member through the contact body in the rotational direction.

A meshing clutch according to the present invention is provided with meshing teeth on one side and on another side to perform meshing, wherein a meshing tooth on the one side is provided on one rotary member being axially movable to perform torque transmission, and a meshing tooth on the other side is provided on another rotary member to perform the torque transmission between said one rotary member and said other rotary member, the meshing tooth on said other side with which the meshing tooth on said one side meshes due to axial movement of said one rotary member, a releasing-guide part inclined is provided at a tooth top of any one of the meshing teeth on said one side and on said other side to bring a tooth top of a counterpart into contact with the releasing-guide part according to relative rotation to guide the releasing, a moving mechanism generates axial force to move said one rotary member to an axial position at which the contact according to the relative rotation is allowed when the meshing teeth mesh to perform transmission of driving torque, and the moving mechanism releases the axial force according to generation of coasting torque, said one rotary member engages with a torque transmission member in a rotational direction and is axially movably supported with the torque transmission member, said other rotary member is relatively rotatably supported and is axially unmovably supported with the torque transmission member, an urging mechanism is provided to be arranged between said one rotary member and the torque transmission member to urge said one rotary member with force being poorer than the axial force being generated by the moving mechanism so that the meshing teeth mesh due to that said one rotary member moves from a neutral position to said other rotary member, the urging mechanism is provided with a contact body and an urging functional part, the contact body is arranged in a supporting hole formed on the torque transmission member in a radial direction and is urged by the urging functional part toward an inner periphery of said one rotary member, and the inner periphery of said one rotary member is provided with an urging and converting part receives the contact body being urged by the urging functional part in the radial direction and converts a direction of the urging to an axial direction to urge the axial movement of said one rotary member and connect said one rotary member to the torque transmission member through the contact body in the rotational direction.

The transmission of the present invention, due to the above-described structure, brings the tooth top of the meshing tooth of the counterpart into contact with the releasing-guide part of the tooth top of the meshing tooth to guide the releasing of the meshing clutch according to the relative rotation when changing the connection from the one shift stage to the other shift stage through simultaneously meshing, and therefore makes the releasing while greatly reducing meshing force acting on the meshing clutch in a relatively rotational direction and reduces shift shock and noise.

The meshing clutch of the present invention, due to the above-described structure, brings the tooth top of the meshing tooth of the counterpart into contact with the releasing-guide part of the tooth top of the meshing tooth to guide the releasing of the meshing clutch according to the relative rotation, and therefore makes the releasing while greatly reducing the meshing force acting on the meshing clutch in the relatively rotational direction and reduces shift shock and noise.

BRIEF DESCRIPTION OF DRAWINGS

FIG. 2 is an explanatory diagram illustrating a 2nd and a 3rd meshing clutches with regard to a 4rth gear and a 5th gear according to the embodiment 1;

FIGS. 3(A) and 3(B) relate to the 4th gear, FIG. 3(A) of which is a development view with partial omission illustrating meshing according to driving torque, and FIG. 3 (B) of which is a development view with partial omission illustrating meshing according to coasting torque according to the embodiment 1;

FIGS. 11(A) and 11(B) illustrate a relation between the cam and a sub-cam, FIG. 11(A) is a front view illustrating the relation between the shift cam and the sub-cam at the time of the shift-up, and FIG. 11(B) is a front view illustrating the relation between the shift cam and the sub-cam at the time of shift-down according to the embodiment 1;

EMBODIMENT FOR CARRYING OUT THE INVENTION

Figure 1:
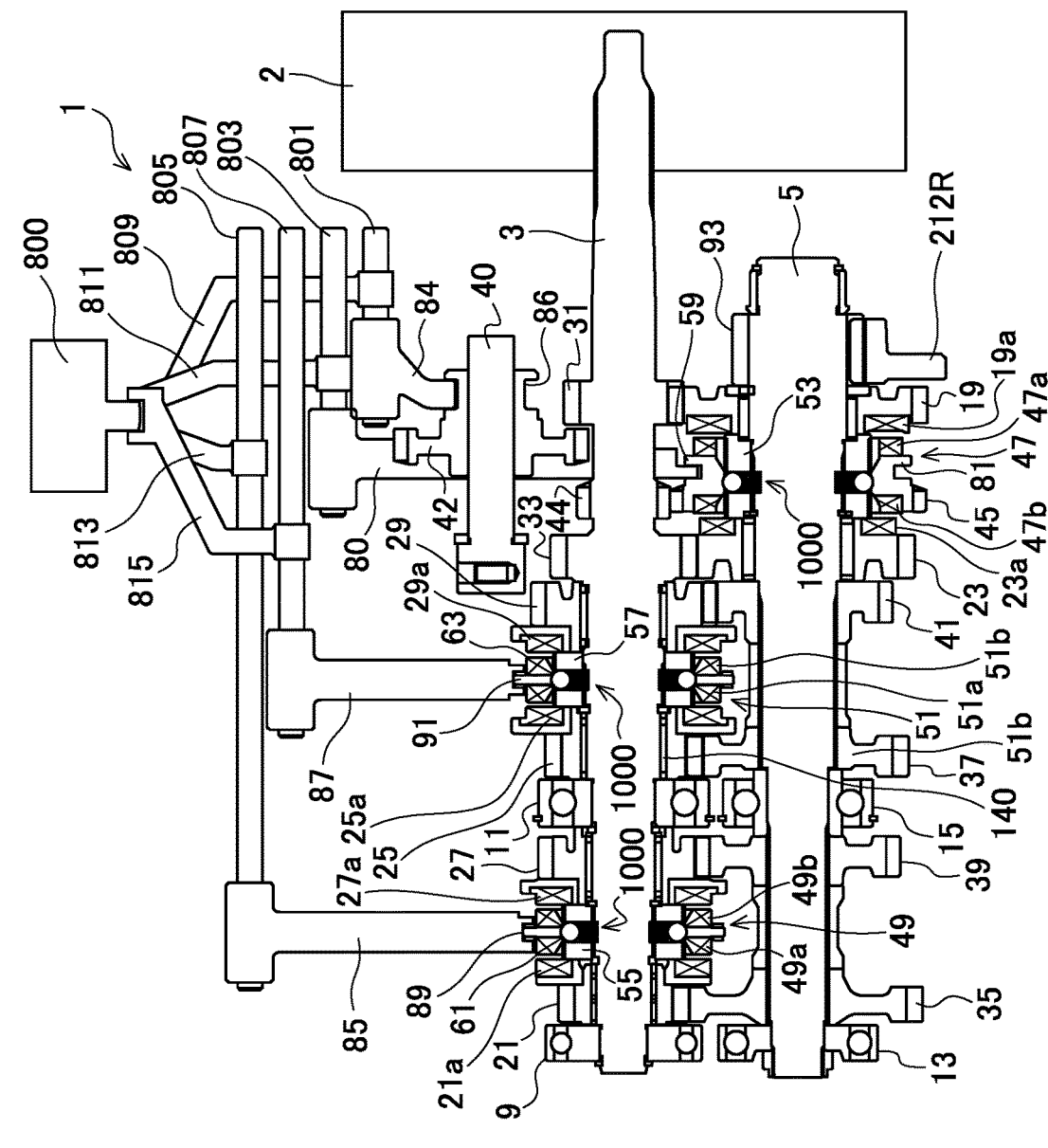
FIG. 1 is a schematic sectional view illustrating a seamless-shift transmission according to an embodiment 1 of the present invention.

The object capable of reducing shock and noise when releasing a meshing clutch on which torque acts is accomplished by the followings.

A transmission is provided with a meshing clutch that connects one shift stage with meshing and is released when changing connection to another shift stage through simultaneously meshing, wherein the meshing clutch is provided with meshing teeth on one side and on another side to perform the meshing, a meshing tooth on the one side is provided on one rotary member being axially movable to perform torque transmission at said one shift stage, and a meshing tooth on the other side is provided on another rotary member to perform the torque transmission between said one rotary member and said other rotary member, the meshing tooth on said other side with which the meshing tooth on said one side meshes due to axial movement of said one rotary member, a releasing-guide part inclined is provided at a tooth top of any one of the meshing teeth on said one side and on said other side to bring a tooth top of a counterpart into contact with the releasing-guide part according to relative rotation to guide the releasing, a moving mechanism generates axial force to move said one rotary member to an axial position at which the contact according to the relative rotation is allowed when the meshing teeth mesh to perform transmission of driving torque, and the moving mechanism releases the axial force according to generation of coasting torque, said one rotary member engages with a torque transmission member in a rotational direction and is axially movably supported with the torque transmission member, said other rotary member is relatively rotatably supported and is axially unmovably supported with the torque transmission member, an urging mechanism is provided to be arranged between said one rotary member and the torque transmission member to urge said one rotary member with force being poorer than the axial force being generated by the moving mechanism so that the meshing teeth mesh due to that said one rotary member moves from a neutral position to said other rotary member, the urging mechanism is provided with a contact body and an urging functional part, the contact body is arranged in a supporting hole formed on the torque transmission member in a radial direction and is urged by the urging functional part toward an inner periphery of said one rotary member, and the inner periphery of said one rotary member is provided with an urging and converting part that receives the contact body being urged by the urging functional part in the radial direction and converts a direction of the urging to an axial direction to urge the axial movement of said one rotary member and connects said one rotary member to the torque transmission member through the contact body in the rotational direction.

The meshing clutch that is released through the simultaneously meshing may be provided every shift stage. The meshing clutch that is released through the simultaneously meshing may be provided to one shift stage and the other shift stages may be shift stages with general meshing teeth.

The meshing tooth may set a meshing face parallel with a rotational axis of the rotary member or a meshing face inclined relatively to the rotational axis forward or backward in a torque transmission direction. In the case of setting the meshing face inclined forward or backward, it may generate axial force in a direction to relatively attract or push the counterpart meshing tooth, or axial force in a direction to relatively push or attract the counterpart meshing teeth.

The releasing-guide part is set by a face inclined so as to have a constant slope over the entire tooth top. The releasing-guide part may be, however, formed by a curved face.

A face parallel with the rotational direction may be formed between an inclined upper end portion of the releasing-guide part and a meshing direction. A chamfer or a round may be formed on the inclined upper end portion of the guide part.

Inclination of the releasing-guide part is set with an angle θ over 45° in the rotational direction relative to an axial center direction of the rotary member and cot θ is over frictional coefficient at the releasing-guide part at which the meshing teeth of said one side and said other side come into contact with each other.

If the releasing-guide part is the curved face, an inclination angle of a tangent at the releasing-guide part at which the meshing teeth of the one side and the other side come into contact with each other may be set with the angle θ over 45° in the rotational direction relative to the axial center direction of the rotary member.

If the releasing-guide part is formed to each rotary member, the releasing-guide parts are intermittently arranged to be set so as to allow the tooth tops of the counterpart meshing teeth.

Said one rotary member is a clutch sleeve engaging with the torque transmission member in the rotational direction and axially movably supported with the torque transmission member, and said other rotary member is a shift gear rotatably supported and axially unmovably supported with the torque transmission member to come into contact.

The relative rotation to guide the releasing is caused by coasting torque and driving torque, the coasting torque generated, when clutch sleeves of lower and upper shift stages respectively simultaneously mesh with the shift gears according to shift-up operation, on the clutch sleeve of the lower stage and the driving torque generated on the clutch sleeve of the upper stage. In the case of the upper shift stage based on shift-down operation, said one rotary member may standby at an axial position which allows the counterpart tooth top to be brought into contact with the releasing-guide part according to the shift-down operation to work the releasing-guide part.

The releasing-guide part is spiral-shaped. The spiral shape is formed by a spiral face, a spiral section, or the like.

The moving mechanism is provided to generate the axial force to move said one rotary member to the axial position at which the contact is allowed when the meshing teeth mesh to perform the torque transmission, and to release the axial force according to the generation of the coasting torque.

The moving mechanism is a moving-guide part formed to be inclined at a root of the meshing tooth to guide the tooth top of the counterpart and move said one rotary member from a 1st meshing position to a 2nd meshing position, thereby to make said one rotary member in the axial position at which the contact according to the relative rotation is allowed when the meshing teeth mesh to perform the transmission of the driving torque.

The moving-guide part is a moving-guide face formed at the root of the meshing tooth. The moving mechanism may be, however, configured by an actuator such as a clutch driver instead of the moving-guide face.

The clutch driver may be configured by, for example, a shift-driving part, and may be set with a relation between setting of shift grooves of a shift drum and shift arms. The clutch driver uses a mechanical torque-adjusting mechanism to move the clutch sleeves and not to apply position-holding force to the clutch sleeves by releasing the clutches in response to receiving force from the clutch sleeves.

Namely, the clutch sleeve of the lower shift stage is moved to the 2nd meshing position according to the setting of the shift grooves of the shift drum at the time of the shift-up, and the clutch sleeve of the upper shift stage side naturally performs meshing movement, thereby to put the upper shift stage and the lower shift stage into the simultaneously meshing.

Said one rotary member engages with the torque transmission member in the rotational direction and is axially movably supported with the torque transmission member, said other rotary member is relatively rotatably supported and is axially unmovably supported with the torque transmission member, the urging mechanism is provided to be arranged between said one rotary member and the torque transmission member to urge said one rotary member with force being poorer than the axial force being generated by the moving mechanism so that the meshing teeth mesh due to that said one rotary member moves from the neutral position to said other rotary member.

The urging mechanism is provided with the contact body and the urging functional part, the contact body is arranged in the supporting hole formed on the torque transmission member in the radial direction and is urged by the urging functional part toward the inner periphery of said one rotary member, and the inner periphery of said one rotary member is provided with the urging and converting part that receives the contact body being urged in the radial direction by the urging functional part, converts the direction of the urging to the axial direction to urge the axial movement of said one rotary member and connect said one rotary member to the torque transmission member through the contact body in the rotational direction.

Namely, the contact body is a ball, the urging functional part is a coil spring, and the ball is supported with the coil spring in the supporting hole in the radial direction so as to be urged and projected. The supporting hole is formed on a clutch hub forming a part of the torque transmission member. The ball enables to be resiliently brought into contact with the urging and converting part being set to be inclined on the inner periphery of the clutch sleeve.

The contact body may be a pin, a burette-shaped body, or the like. The urging functional part may be a configuration using centrifugal force of the ball itself, a configuration using hydrostatic pressure on the basis of introducing oil pressure into the supporting hole through an oil hole on the torque transmission member side, and a combination of them instead of the coil spring.

The urging mechanism may function if it is provided at one place in the axial direction, and may be arranged at a plurality of places. The urging and converting part is an inclined groove portion to connect said one rotary member to the torque transmission member through the contact body in the rotational direction, and the inclined groove portion relates to the torque transmission. The inclined groove portion may be, however, configured as an inclined portion not to relate to the torque transmission.

Said one shift stage is an upper stage and said other shift stage is a lower stage, provided is a shift-driving part that changes the connection from said one shift stage to said other shift stage, wherein the shift-driving part sets shift strokes for axial movements of one rotary member of the upper shift stage and one rotary member of the lower shift stage in order to change the connection to said other shift stage, and in the setting of the shift strokes by the shift-driving part, shift-down to the lower stage is larger than shift-up to the upper stage.

The setting of the shift strokes is performed with rotatably connecting the smaller sub-cam to a body of the shift cam, for example. The sub-cam protrudes according to rotation of the shift cam interlocked with the shift arm in one direction to increase an outline of the shift cam, thereby to increase a swinging range of the rocker arm in one direction relatively to in the other direction and change the setting of the shift strokes.

Provided are the shift-driving part that changes the connection from said one shift stage to said other shift stage, a detector that detects the axial position of said one rotary member of said one shift stage, and a controlling part that cancels the changing of the connection to said other shift stage according to the shift-driving part when changing the connection to said other shift stage through the simultaneously meshing and when the detected one rotary member is not at an axial position to be moved according to operation of the moving mechanism.

The shift-driving part may be any one of which drives the shift cam, the shift drum and the like using an electric motor or the like to change the connection of the shift stage or which is based on manual shift operation.

A proximity sensor, a laser sensor, a 360° angle sensor or the like may be used as the detector, and the detector detects positions of a shift fork, a shift rod, the clutch sleeve and the like. A shift sensor to be originally provided on the transmission may be used. The controlling part may determine that the clutch sleeve of one shift stage is not in an original axial position to cancel the connection of the shift stage if it does not indicate a position in which the clutch sleeve is originally.

In the state of canceling the change of the connection to the other shift stage using the shift-driving part, an alarm may be generated.

The meshing clutch is provided with meshing teeth on one side and on another side to perform meshing, wherein a meshing tooth on the one side is provided on one rotary member being axially movable to perform torque transmission, and a meshing tooth on the other side is provided on another rotary member to perform the torque transmission between said one rotary member and said other rotary member, the meshing tooth on said other side with which the meshing tooth on said one side meshes due to axial movement of said one rotary member, a releasing-guide part inclined is provided at a tooth top of any one of the meshing teeth on said one side and on said other side to bring a tooth top of a counterpart into contact with the releasing-guide part according to relative rotation to guide the releasing, a moving mechanism is provided to generate axial force to move said one rotary member to an axial position at which the contact is allowed when the meshing teeth mesh to perform transmission of driving torque, and the moving mechanism releases the axial force according to generation of coasting torque, said one rotary member engages with a torque transmission member in a rotational direction and is axially movably supported with the torque transmission member, said other rotary member is relatively rotatably supported and is axially unmovably supported with the torque transmission member, an urging mechanism is provided to be arranged between said one rotary member and the torque transmission member to urge said one rotary member with force being poorer than the axial force being generated by the moving mechanism so that the meshing teeth mesh due to that said one rotary member moves from a neutral position to said other rotary member, the urging mechanism is provided with a contact body and an urging functional part, the contact body is arranged in a supporting hole formed on the torque transmission member in a radial direction and is urged by the urging functional part toward an inner periphery of said one rotary member, and the inner periphery of said one rotary member is provided with an urging and converting part that receives the contact body being urged by the urging functional part in the radial direction and converts a direction of the urging to the axial direction to urge the axial movement of said one rotary member and to connect said one rotary member to the torque transmission member through the contact body in the rotational direction.

FIG. 1 is a schematic sectional view illustrating a seamless-shift transmission according to the embodiment 1 of the present invention.

As illustrated in FIG. 1, a transmission 1 is provided with a solid main shaft 3 and a solid counter shaft 5 as torque transmission members, and a solid idler shaft 40. The main shaft 3 and the counter shaft 5 are rotatably supported with a transmission case (not illustrated) through bearings 9, 11, 13, 15 and the like. The idler shaft 40 is fixed to the transmission case side.

To the main shaft 3 and the counter shaft 5, a 1st gear 19, a 2nd gear 21, a 3rd gear 23, a 4th gear 25, a 5th gear 27, and a 6th gear 29 as shift gears of a plurality of shift stages are relatively rotatably supported at appropriate positions.

The 1st gear 19 and the 3rd gear 23 on the counter shaft 5 mesh with output gears 31, 33 of the main shaft 3, and the 2nd gear 21, the 4th gear 25, the 5th gear 27, and 6th gear 29 at the main shaft 3 respectively mesh with gears 35, 37, 39, 41 on the counter shaft 5.

A reverse idler 42 on the idler shaft 40 is arranged so as to be meshable with an output gear 44 on the main shaft 3 and an input gear 45 on the counter shaft 5 according to axial movement.

The 1st gear 19 and the 3rd gear 23 are selectively connected to the counter shaft 5 with a 1st meshing clutch 47. The 2nd gear 21 and the 5th gear 27, and the 4th gear 25 and the 6th gear 29 are selectively respectively connected to the main shaft 3 with a 2nd and a 3rd meshing clutches 49, 51. The selectively connecting enables transmission output to be performed from the main shaft 3 to the counter shaft 5.

The 1st-3rd meshing clutches 47, 49, 51 are configured to selectively connect one shift stage with meshing and is released when changing the connection to the other shift stage through simultaneously meshing.

For example, change of connection from the 1st gear 19 to the 2nd gear 21 is performed by the 1st and the 2nd meshing clutches 47, 49.

The 1st-3rd meshing clutches 47, 49, 51 basically have the same structure, and are provided with clutch hubs 53, 55, 57, and clutch sleeves 59, 61, 63, meshing teeth 47a, 47b, 49a, 49b, 51a, 51b, 19a, 21a, 23a, 25a, 27a, 29a.

The meshing teeth 47a, 47b, 49a, 49b, 51a, 51b on one side are provided on the clutch sleeves 59, 61, 63. The meshing teeth 47a, 47b, 49a, 49b, 51a, 51b are provided on counter faces of the clutch sleeves 59, 61, 63 against the 1st gear 19 to the 6th gear 29. The clutch sleeves 59, 61, 63 form one rotary members. Namely, the clutch sleeves 59, 61, 63 engage and are axially movably supported with the main shaft 3 or the counter shaft 5 as the torque transmission members in a rotational direction.

The meshing teeth 19a, 21a, 23a, 25a, 27a, 29a on the other side are provided on the 1st gear 19 to the 6th gear 29. The meshing teeth 19a, 21a, 23a, 25a, 27a, 29a are provided on counter faces of the 1st gear 19 to the 6th gear 29 against the clutch sleeves 59, 61, 63. The 1st gear 19 to the 6th gear 29 form the other rotary members. Namely, the 1st gear 19 to the 6th gear 29 are relatively rotatably supported and are axially unmovably supported with the main shaft 3 or the counter shaft 5 through needle bearings or the like.

Due to the selectively connecting of the clutch sleeves 59, 61, 63, the meshing teeth 47a, 47b, 49a, 49b, 51a, 51b on the one side selectively mesh with the meshing teeth 19a, 21a, 23a, 25a, 27a, 29a on the other side.

The clutch hub 53 of the 1st meshing clutch 47 is connected to the counter shaft 5 with spline fitting or the like to be integrally rotatable. The clutch hubs 55, 57 of the 2nd and the 3rd meshing clutches 49, 51 are connected to the main shaft 3 with spline fitting or the like to be integrally rotatable. Positioning the clutch hubs 53, 55, 57 is performed by stepped portions formed on the counter shaft 5 and the main shaft 3 and snap rings. The clutch hub 53 is spline-fitted to the counter shaft 5, one side of which is brought into contact with the stepped portion of the counter shaft 5, and the snap ring engaged with the counter shaft 5 is positioned and arranged on the other side of the clutch hub 53. The clutch hubs 55, 57 are also positioned relatively to the main shaft 3 with similar structures.

The clutch sleeves 59, 61, 63 of the 1st to the 3rd meshing clutches 47, 49, 51 are fitted and arranged on outer peripheries of the clutch hubs 53, 55, 57, and are axially movably spline-connected thereto. The clutch sleeve 61 is provided to selectively connect the 2nd gear 21 or the 5th gear 27 as shift gears to and the clutch sleeve 63 is provided to selectively connect the 4th gear 25 or the 6th gear 29 to the main shaft 3 to perform the transmission output. The clutch sleeve 59 is provided to selectively connect the 1st gear 19 or the 3rd gear 23 as shift gears to the counter shaft 5 to perform the transmission output.

To the clutch sleeve 59, a circumference recessed stripe 81 into which a shift fork 80 fits is formed. To also the reverse idler 42 on the idler shaft 40, a circumference recessed stripe 86 into which a shift fork 84 fits is formed. In addition, the idler shaft 40 is fixedly supported on the transmission case. On the clutch sleeve 59, the input gear 45 is further formed. On the clutch sleeves 61, 63, circumference projected stripes 89, 91 to which shift forks 85, 87 fit are formed. On both sides of the clutch sleeves 59, 61, 63, the 1st gear 19, the 2nd gear 21, the 3rd gear 23, the 4th gear 25, the 5th gear 27, the 6th gear 29 are selectively arranged on the both sides so as to take two speeds or more away from each other to selectively mesh with the shift gears on both sides, respectively.

Namely, the 1st gear 19 and the 3rd gear 23 are arranged on the respective sides of the clutch sleeve 59, the 2nd gear 21 and the 5th gear 27 are arranged on the respective sides of the clutch sleeve 61, and the 4th gear 25 and the 6th gear 29 are arranged on the respective sides of the clutch sleeve 63.

The 1st-3rd meshing clutches 47, 49, 51 are selectively operated by a shift mechanism 800 as a shift-driving part. The reverse idler 42 is also configured to be operated by the shift mechanism 800.

The shift mechanism 800 is provided in the transmission case, and is configured to be interlocked with the 1st-3rd meshing clutches 47, 49, 51 through the shift forks 80, 85, 87, shift rods 803, 805, 807, shift arms 811, 813, 815. The shift mechanism 800 is configured to be interlocked with the reverse idler 42 through the shift fork 80, a shift rod 801, and a shift arm 809.

1st-3rd urging mechanisms 1000 are arranged between the clutch sleeves 59, 61, 63 of the 1st-3rd meshing clutches 47, 49, 51 and the clutch hubs 53, 55, 57. The 1st urging mechanism 1000 urges the clutch sleeve 59. Namely, the clutch sleeve 59 is urged so that the meshing teeth 47a and 19a or the meshing teeth 47a and 23a mesh due to movement from a neutral position toward the 1st gear 19 or the 3rd gear 23. The second urging mechanism 1000 urges the clutch sleeve 61. Namely, the clutch sleeve 61 is urged so that the meshing teeth 49a and 21a or the meshing teeth 49b and 27a mesh due to movement from a neutral position toward the 2nd gear 21 or the 5th gear 27. The 3rd urging mechanism 1000 urges the clutch sleeve 63. Namely, the clutch sleeve 63 is urged so that the meshing teeth 51a and 25a or the meshing teeth 51b and 29a mesh due to movement from a neutral position toward the 4th gear 25 or the 6th gear 29.

The 1st-3rd urging mechanisms 1000 have substantially the same structure, and the 3rd urging mechanism 1000 in the 3rd meshing clutch 51 will be representatively explained later.

The output of the transmission 1 is performed from a front differential device meshing with an output gear 93 of the counter shaft 5 through a reduction gear 212R.

Namely, the shift rods 801, 803, 805, 807 are selectively driven through any one of the shift arms 809, 811, 813, 815 when the shift mechanism 800 is driven based on a manual operation signal of a shift lever or based on an accelerator opening and a vehicle speed signal and the like according to operation of an accelerator pedal.

With the driving of the shift rod, the 1st, 2nd, and 3rd meshing clutch 47, 49, or 51 is driven and operated through the shift fork 80, 85, and 87, or the reverse idler 42 is driven and operated through the shift fork 84. With this operation, the 1st gear 19 to the 6th gear 29, or the reverse idler 42 is selectively connected to perform shifting of shift-up, shift-down, or reverse.

FIG. 2 is an explanatory diagram illustrating the 2nd and the 3rd meshing clutches with regard to the 4th gear and the 5th gear. FIG. 3 relates to a state of the 4th gear, (A) of which is a development view with partial omission illustrating meshing according to driving torque, and (B) of which is a development view with partial omission illustrating meshing according to coasting torque.

The meshing teeth of the 1st-3rd meshing clutches 47, 49, 51 according to the present embodiment are formed to have the same structure. Accordingly, a concrete shape will be explained for the meshing tooth of the 3rd meshing clutch 51 with reference to FIG. 2 and FIG. 3, and the shapes of the meshing tooth for the 1st and the 2nd meshing clutches 47, 49 befittingly refer to shape of the meshing tooth of the 3rd meshing clutch 51 to omit duplicate explanation.

As illustrated in FIG. 1, FIG. 2, and FIG. 3, the 3rd meshing clutch 51 includes the plurality of the meshing teeth 51a, 51b of the clutch sleeve 63, and the plurality of the meshing teeth 25a of the 4th gear 25 and the plurality of the meshing teeth 29a (FIG. 1) of the 6th gear 29 (FIG. 1) that mesh with the meshing teeth 51a, 51b.

The 3rd meshing clutch 51 of the present embodiment will be further explained with relation to the clutch sleeve 63 and the 4th gear 25. The meshing teeth 51a of the clutch sleeve 63 and the meshing teeth 25a of the 4th gear 25 are set in a uniform height in the circumferential direction. The meshing teeth 51a, 25a are set to be alternated between high and low teeth at predetermined intervals in the circumferential direction, for example, every other tooth.

The meshing teeth 51a, 25a are formed in a spiral shape relative to an axial center of the main shaft 3. Accordingly, when the meshing teeth 51a meshes or are released from the meshing teeth 25a, the meshing of them is spirally guided with operation like a screw. The spiral shape relative to the axial center includes the spiral shape around the axial center and the spiral shape in which a center of the spiral is offset from the axial center.

At tooth tops of, for example, the meshing teeth 25a as one of the meshing teeth 25a, 51b of the 3rd meshing clutch 51, releasing-guide faces 97 as releasing-guide parts are provided. The meshing teeth 25a are provided with drive-meshing faces 101 at rear portions in a driving torque transmission direction, and are provided with coast-meshing faces 99 at front portions in the same direction.

The drive-meshing faces 101, the releasing-guide faces 97, and the coast-meshing faces 99 are formed in spiral shapes in order to make the meshing teeth 25a spiral.

The releasing-guide face 97 is formed so as to be gradually inclined relatively to a rotational center of the main shaft 3 in the rotational direction. With the inclination, the releasing-guide face 97 has a function to relatively guide the other meshing tooth 51a according to the coasting torque to generate axial force on the clutch sleeve 63 in a meshing-releasing direction.

For example, when shifting up from the 4th speed as one shift stage to the 5th speed as the other shift stage, the clutch sleeves 63, 61 are subjected to simultaneously meshing. The simultaneously meshing is a state that the 5th gear 27 is connected to the main shaft 3 according to the meshing of the clutch sleeve 61 of the 2nd meshing clutch 49 while the 4th gear 25 is connected to the main shaft 3 according to the meshing of the clutch sleeve 63.

It is configured that, when change the connection to the 5th gear 27 from the connection of the 4th gear 25 through the simultaneously meshing, the meshing teeth 25a, 51a receive relative torque to bring a tooth top of the meshing tooth 51a into contact with the releasing-guide face 97 to move the clutch sleeve 63 away from the 4th gear 25.

In this case, the relative rotation is caused by the coasting torque generated on the lower shift stage and the driving torque generated on the upper shift stage according to the simultaneously meshing with the clutch sleeves 61, 63 in the shift-up operation.

According to the present embodiment, the releasing-guide face 97 is formed so as to be inclined along the rotational direction, an inclination angle of which is set within a range of θ=45°-80° relative to the axial center of the main shaft 3. The inclination of the releasing-guide face 97 has a setting in which cot θ exceeds over a friction coefficient between the meshing teeth 25a, 51a at the releasing-guide face 97. It should be noted that the inclination angle of the releasing-guide face 97 should be one generating axial force on the clutch sleeve 63 of the lower shift stage in the meshing-releasing direction according to the coasting torque when the clutch sleeves 61, 63 of the lower shift stage and the upper shift stage perform the simultaneously meshing, and may have an upper limit over 80° in some cases.

The inclination angle of 45° of the releasing-guide face 97 relative to the axial center at which component force in a rotational center direction competes with component force in the circumferential direction is defined as a limit to suppress increase of internal circulation torque which is explained later in comparison with the inclination angle less than 45° at which the component force in the rotational center direction surpasses.

In addition, the releasing-guide face 97 may be made greater from the middle to the tooth top 113 in the inclination angle. The inclined upper end side of the releasing-guide face 97 may be formed by a face along the rotational direction. The releasing-guide face 97 and the drive-meshing face 101 may be continuous with a round.

The releasing-guide face 97 is formed substantially entirely over a tooth thickness in the circumferential direction of the clutch sleeve 61, and has the spiral shape from an inner diameter side toward an outer diameter side. The releasing-guide face 97 may not be formed in the spiral shape and may be configured by an inclined face along the radial direction.

The drive-meshing face 101 is set to be oriented rearward with respect to the transmission direction of the driving torque. The drive-meshing face 101 is set to be inclined rearward in the transmission direction of the driving torque toward the tooth top relatively to the rotational center. With the setting of the inclination, it functions to attract the meshing tooth 51*a* in a meshing direction when meshing the meshing tooth 51*a*.

It should be noted that the drive-meshing face 101 may be set so as to be inclined forward in the transmission direction of the driving torque toward the tooth top. In this case, it functions to push out the meshing tooth 51*a* in the meshing direction when meshing the meshing tooth 51*a*. The pushing function is in a degree not to cause the releasing at the time of the transmission of the driving torque.

The moving mechanism generates axial force to move the clutch sleeve 63 to a 2nd meshing position being an axial position at which the meshing tooth 51*a* is allowed to be brought into contact with the releasing-guide face 97 when the meshing teeth 25*a*, 51*a* mesh to perform the torque transmission, and the moving mechanism releases the axial force according to generation of the coasting torque.

A root of the meshing tooth 25*a* is provided with a moving-guide face 101*a* adjacent to the drive-meshing face 101. The moving-guide face 101*a* forms a moving-guide part as the moving mechanism. The moving-guide face 101*a* is a face formed to be inclined at the root of the meshing tooth 25*a*. When the meshing teeth 25*a*, 51*a* mesh to perform the transmission of the driving torque, it guides the tooth top 113 of the counterpart to generate axial force to move the counterpart tooth top from a 1st meshing position to the 2nd meshing position of the axial position and release the axial force according to the generation of the coasting torque. The 1st meshing position is a deep meshing position at which the coast-meshing faces 99, 115 are allowed to mesh according to relative rotation of the clutch sleeve 63 and the 4th gear 25 at the time of the coasting torque. The 2nd meshing position is a shallow meshing position at which the tooth top of the meshing tooth 51*a* faces the releasing-guide face 97 in the rotational direction.

The moving-guide face 101*a* is inclined relatively to the rotational center. With the inclination, the moving-guide face 101*a* generates axial force on the meshing tooth 51*a* when being come into contact with the tooth top of the meshing tooth 51*a* according to the driving torque. With the axial force, the meshing tooth 51*a* moves to the 2nd meshing position from the 1st meshing position. The 2nd meshing position has a distance ΔX from a face of a bottom of the meshing tooth 25*a*.

Namely, the clutch sleeve 63 is moved so that the tooth tops of the meshing teeth 51*a* of the 4th speed become positioned from the 1st meshing position to the 2nd meshing position when changing the connection from the 4th speed of one shift stage to the 5th speed of the other shift stage through the simultaneously meshing.

The coast-meshing face 99 of the meshing tooth 25*a* is meshed with the meshing tooth 51*a* at the time of shifting, and engine braking. The coast-meshing face 99 is risen at an inclined lower end of the releasing-guide face 97 along the axial center direction of the main shaft 3. The coast-meshing face 99 is set so as to be inclined rearward in the transmission direction of the coasting torque toward the releasing-guide face 97 from the face of the bottom relatively to the rotational center of the main shaft 3.

With the inclination setting of the coast-meshing face 99, the coast-meshing face functions to attract the meshing tooth 51*a* in the meshing direction when meshing the meshing tooth 51*a* according to the coasting torque.

It should be noted that the coast-meshing face 99 may be set so as to be inclined forward in the transmission direction of the coasting torque toward the releasing-guide face 97. In this case, it functions to push out the meshing tooth 51*a* in the meshing direction when meshing the meshing tooth 51*a*. The pushing function is, however, in a degree not to cause the releasing at the time of the transmission of the engine braking. Axial force acting on the clutch sleeve 63 at the time of the engine braking is extremely little, and the meshing teeth 25*a*, 51*a* are reasonably kept on meshing according guiding or the like on the shift mechanism 800 side.

A height of the coast-meshing face 99 in the rotational center direction is set as low as possible in a range not to release the clutch sleeve 63 from the meshing teeth 25*a* of the 4th gear 25 on the other side at the time of the engine braking. The coast-meshing face 99 may be set to zero in the inclination relative to the rotational center of the main shaft 3.

In the configuration in which pushing operation acts on the meshing tooth 51*a* according to the inclination angle of the coast-meshing face 99, the inclination angle of the coast-meshing face 99 is set in a degree not to autonomously release the meshing tooth 51*a* of the clutch sleeve 63 from the meshing tooth 25*a* of the 4th gear 25 at the time of the engine braking. Further, if generated axial force is small according to the inclination angle of the coast-meshing face 99, it may employ a configuration in which the releasing is prevented by the setting of the shift mechanism 800 or the like. Even if the coast-meshing face 99 is eliminated, the meshing tooth 51*a* of the clutch sleeve 63 may engage with the inclined lower end of the releasing-guide face 97, and this engagement state may be kept by the setting of the shift mechanism 800 or the like.

The tooth top 113 of the meshing tooth 51*a* of the clutch sleeve 63 is formed by a flat face or a rounded face (curved face). On the meshing tooth 51*a*, a drive-meshing face 119, and a coast-meshing face 115. The drive-meshing face 119 and the coast-meshing face 115 of the meshing tooth 51*a* are set in inclination and the like so as to correspond to the drive-meshing face 101 and the coast-meshing face 99 of the meshing tooth 25*a*.

The tooth top 113 of the meshing tooth 51*a*, the drive-meshing face 119, and the coast-meshing face 115 are formed in spiral shapes relative to the rotational center of the main shaft 3. The spiral shapes are for making the meshing tooth 51*a* a spiral shape similar to the meshing tooth 25*a*. Thus, if the meshing tooth 25*a* does not have the spiral shape and has a shape along the radial direction, the meshing tooth 51*a* also has a shape along the radial direction similarly.

In the development views of FIG. 3, heights and face widths in the rotational direction of the meshing teeth 25*a*, 51*a* are set to be approximately the same. Distances between the meshing teeth 25*a*, 51*a* are set larger than the face widths. According to the present embodiment, the distances between the teeth are set approximate 1.5 times larger than the widths of the tooth tops. The setting of the distances of the teeth is to make the meshing teeth 25*a*, 51*a* smoothly mesh and release, and the setting is unlimited.

It should be noted that the meshing teeth 25*a* may be formed on the clutch sleeve 63 and the meshing teeth 51*a* may be formed on the 4th gear 25 although the meshing teeth 25a are formed on the 4th gear 25 and the meshing teeth 51a are formed on the clutch sleeve 63 in the above explanation.

Figure 4:
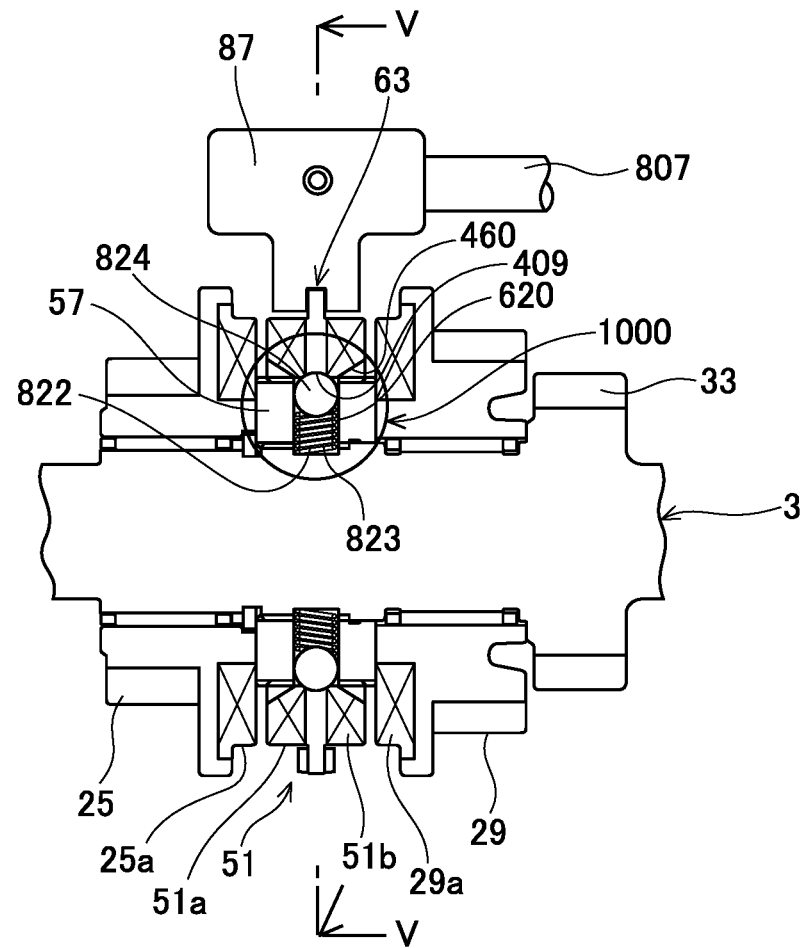
FIG. 4 is an enlarged sectional view of an urging mechanism in the 3rd meshing clutch according to the embodiment 1.
Figure 5:
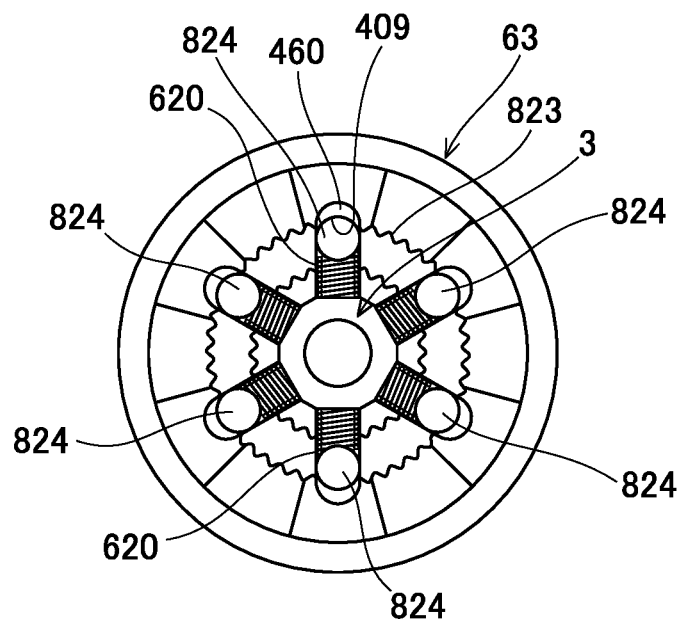
FIG. 5 is a sectional view taken along a line V-V of FIG. 4.
Figure 6:
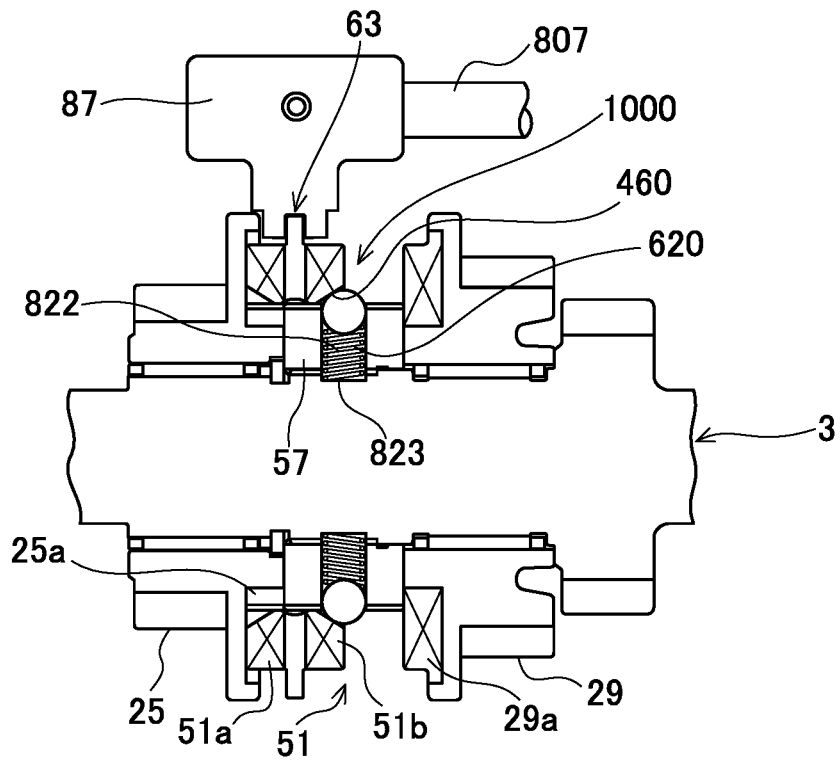
FIG. 6 is a sectional view illustrating an urging state of the clutch sleeve toward the 4th gear with the urging mechanism according to the embodiment 1.
Figure 7:
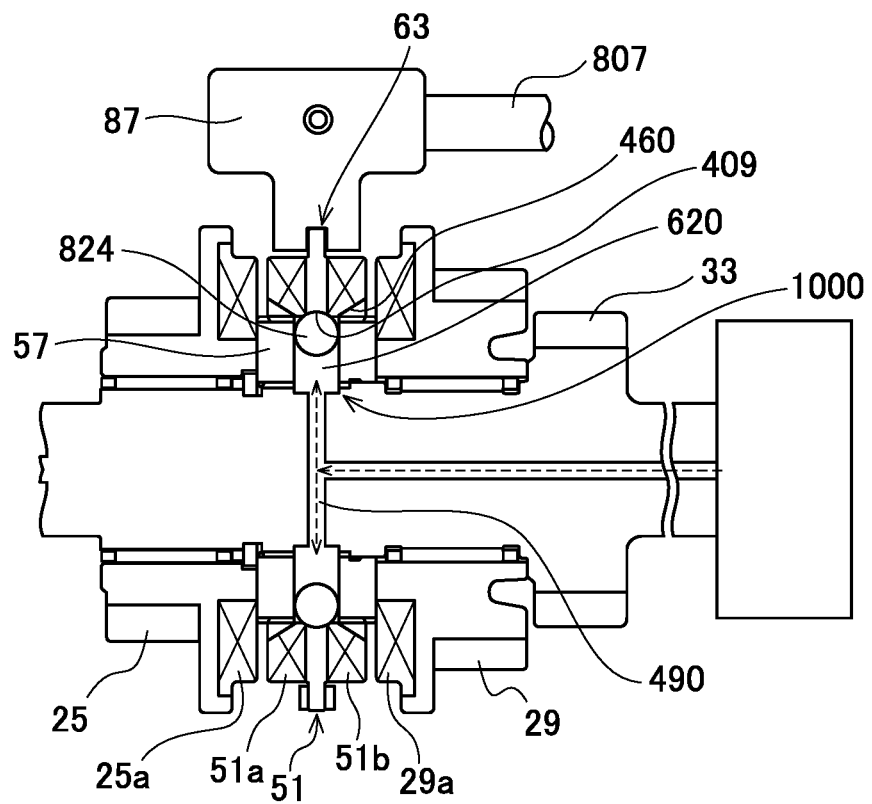
FIG. 7 is a sectional view illustrating a modification example of the urging mechanism according to the embodiment 1.

FIG. 4 is an enlarged sectional view of the urging mechanism in the 3rd meshing clutch. FIG. 5 is a sectional view taken along a line V-V of FIG. 4. FIG. 6 is a sectional view illustrating an urging state of the clutch sleeve toward the 4th gear with the urging mechanism. FIG. 7 is a sectional view illustrating a modification example of the urging mechanism.

The 3rd urging mechanism 1000 in the 3rd meshing clutch 51 is provided with a ball 824 as a contact body and a coil spring 822 as an urging functional part.

A supporting hole 620 is formed to and through the clutch hub 57 in the radial direction. A recessed portion 823 like a spring seat is formed to the main shaft 3 so as to face the supporting hole 620. A plurality of the supporting holes 620 are formed at predetermine intervals in the circumferential direction. According to the embodiment, they are provided evenly at 6 positions. The ball 824 is accommodated in each supporting hole 620 as well as the coil spring 822. An inner radial end of each coil spring 822 is seated on each recessed portion 823. Each ball 824 is urged toward the inner periphery of the clutch sleeve 63 with each coil spring 822. The inner periphery of the clutch sleeve 63 is provided with an inclined groove portion 460 as an urging and converting part. The inclined groove portion 460 receives the ball 824 being urged in the radial direction by the coil spring 822 and converts urging in the radial direction to in the axial direction to urge the axial movement of the clutch sleeve 63.

The inclined groove portions 460 are provided evenly in the circumferential direction at 6 positions according to the respective balls 824 in the embodiment.

As illustrated in FIG. 5, a sectional shape of the inclined groove portion 460 is formed so as to fit the ball 824 without rattle and have a round with a radius slightly larger than a radius of the ball 824.

The ball 824, therefore, fits to the inclined groove portion 460 to connect the clutch sleeve 63 to the clutch hub 57 of the main shaft 3 through the ball 824 in the rotational direction. With this connection, reduction of a meshing area between the clutch hub 57 and the clutch sleeve 63 according to the spline is made little and practical strength is kept.

The inclined groove portion 460 may be provided only on one side of the clutch sleeve 63 according to the specification of the transmission 1. The inclined groove portion 460 is formed to be inclined from the inner periphery of the clutch sleeve 63 to a side face of the clutch sleeve. On the inner periphery of the clutch sleeve 63, a trough portion 409 is formed between the inclined groove portions 460 on both sides in the axial direction.

The clutch sleeve 63 is, therefore, positioned at the neutral position by bringing the balls 824 into resiliently contact with the trough portions 409 as illustrated in FIG. 4. In addition, the trough portions 409 may be omitted. When the clutch sleeve 63 moves according to the driving with the shift mechanism 800, the balls 824 fit to the inclined groove portions 460 on the rear in a moving direction, to come into contact with the inclined groove portions 460 and push the inclined groove portion in the radial direction. This urging due to the contact in the radial direction is converted into urging in the axial direction according to the inclination of the inclined groove portions 460. Accordingly, the clutch sleeve 63 is pushed in a shift direction as illustrated in FIG. 5, and the meshing teeth 51a are urged so as to mesh with the meshing teeth 25a of the 4th gear 25. When the clutch sleeve 63 is shifted toward the 6th gear, the inclined groove portions 460 on the opposite side function to perform the meshing of the meshing teeth 51a with respect to the meshing teeth 29a of the 6th gear 29 similarly.

It should be noted that the coil springs 822 applying the urging force to the balls 824 may be replaced with hydrostatic pressure of FIG. 7. In this configuration, it is configured that oil pressure is led into the supporting holes 620 from oil holes 490 on the main shaft 3 as the torque transmission member.

The axial force generated by the urging mechanism 1000 is set smaller than the axial force applied to the meshing teeth 51a by the moving-guide faces 101a of the meshing tooth 25a in a driven state of an engine. Accordingly, the clutch sleeve 63 positioned at the 2nd meshing position keeps its position and the meshing teeth 51a keep the distance of ΔX from the faces of the bottoms of the meshing teeth 25a in the 3rd meshing clutch 51 even in the case that the urging mechanism 1000 has the urging force.

Figure 8:
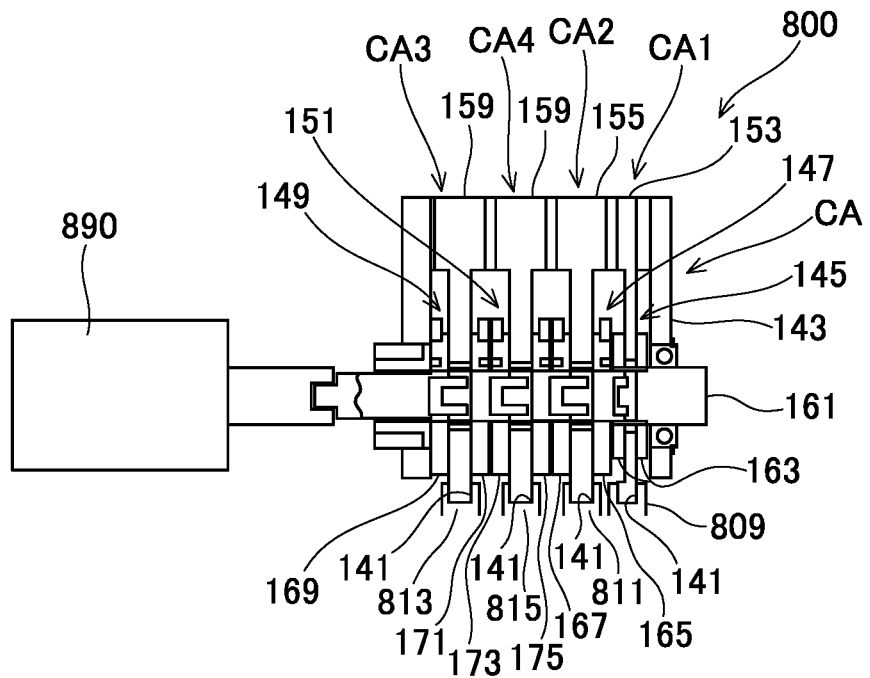
FIG. 8 is a sectional view of a shift mechanism according to the embodiment 1.
Figure 9:
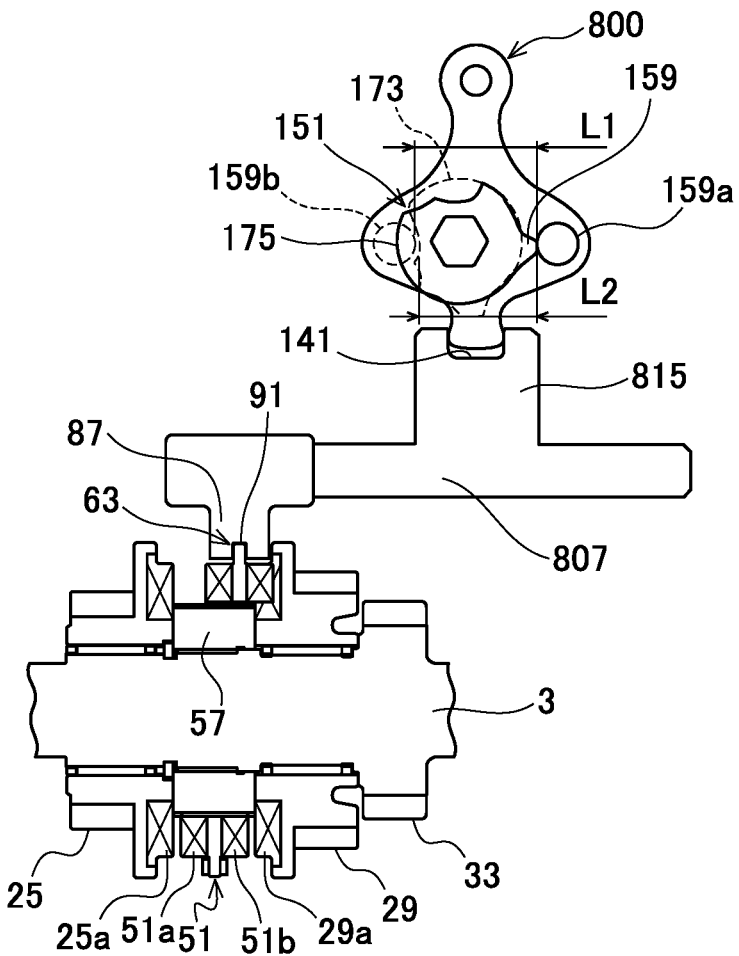
FIG. 9 is an explanatory view illustrating a relation between a shift function and the 3rd meshing clutch according to the embodiment 1.
Figure 10:
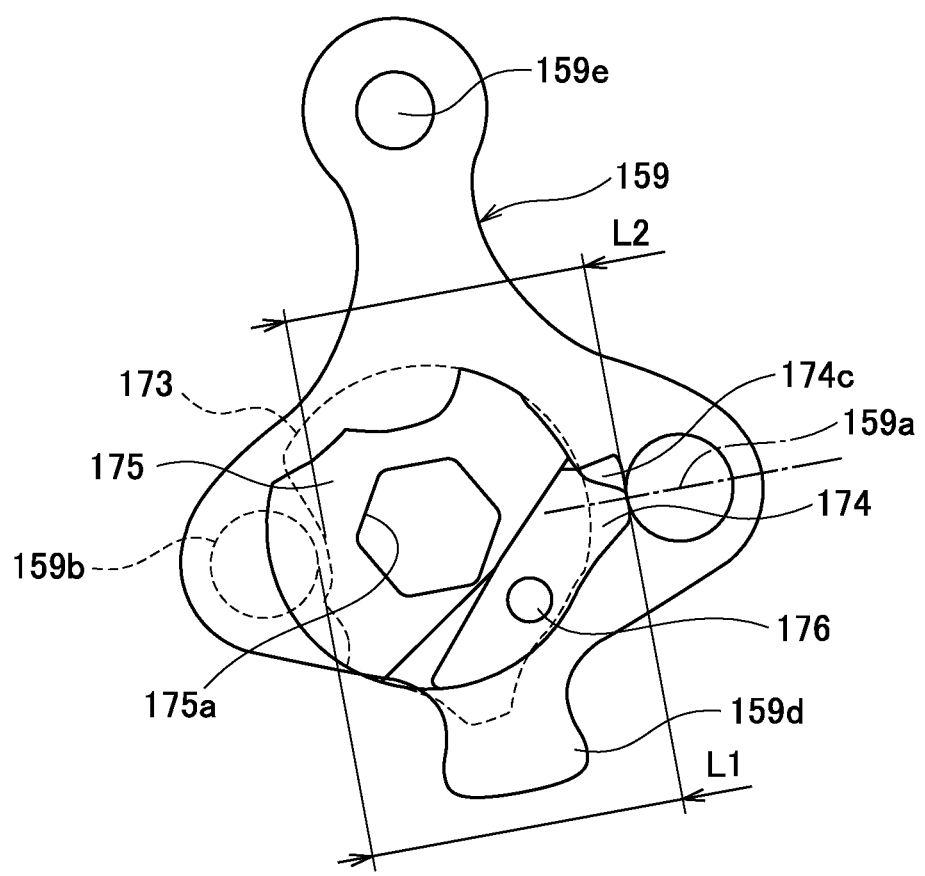
FIG. 10 is a front view of a relation between a shift cam and a rocker arm seen from the shift cam side of a 6th speed at the time of shift-up according to the embodiment 1.
Figure 12:
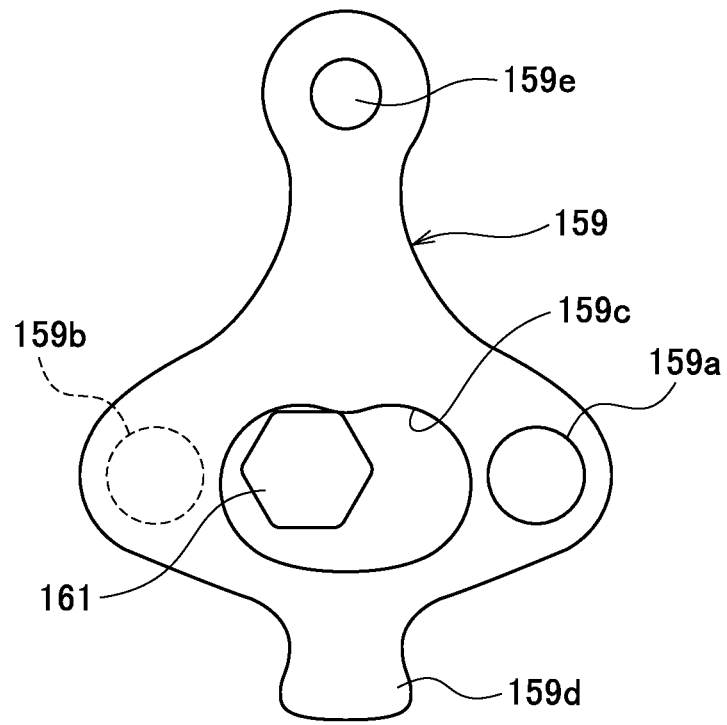
FIG. 12 is a front view of the rocker arm according to the embodiment 1.

FIG. 8 is a sectional view of the shift-driving part. FIG. 9 is an explanatory view illustrating a relation between the shift-driving part and the 3rd meshing clutch. FIG. 10 is a front view of a relation between a shift cam and a rocker arm seen from the shift cam side of the 6th speed at the time of the shift-up. FIG. 11 illustrates a relation between the shift cam and a sub-cam, (A) of which is a front view illustrating the relation between the shift cam and the sub-cam at the time of the shift-up, and (B) of which is a front view illustrating the relation between the shift cam and the sub-cam at the time of the shift-down. FIG. 12 is a front view of the rocker arm.

As illustrated in FIG. 8 and FIG. 9, the 3rd meshing clutch 51 engages with respect to the rocker arm 159 of the shift mechanism 800 as the shift-driving part with an engaging part 141 of the shift arm 815.

The shift mechanism 800 of FIG. 8 of the present embodiment is configured by commonly using the rocker arm by a pair of the shift cams as a set.

The shift mechanism 800 is provided with cam mechanisms CA1-CA4 in a housing 143. The cam mechanism CA1 is for a reverse gear and to drive the shift arm 809. The cam mechanism CA2 is for the 1st speed and the 3rd speed and to drive the shift arm 811. The cam mechanism CA3 is for the 2nd speed and the 5th speed and to drive the shift arm 813. The cam mechanism CA4 is for 4th speed and the 6th speed and to drive the shift arm 815.

The cam mechanisms CA1-CA4 are provided with cam sets 145, 147, 149, and 151, and rocker arms 153, 155, 157, and 159 as shift operation parts for the respective cam mechanisms CA1-CA4.

Shift guiding for the rocker arms 153, 155, 157, and 159 is performed by respective engagement guiding according to respective cam faces of the cam sets 145, 147, 149, and 151. With the shift guiding, the respective rocker arms 153, 155, 157, and 159 axially moves the shift arms 809, 811, 813, and 815 through the respective engagement portion 141 in the shift direction.

The cam sets 145, 147, 149, and 151 are attached to a cam shaft 161. The cam set 145 is provided with a shift cam 163 for the reverse, the cam set 147 is provided with a shift cam 165 for the 1st speed and a shift cam 167 for the 3rd speed, the cam set 149 is provided with a shift cam 169 for the 2nd speed and a shift cam 171 for the 5th speed, and the cam set 151 is provided with a shift cam 173 for the 4th speed and a shift cam 175 for the 6th speed as operation output rotation parts according to the plurality of the shift stages, respectively. The respective shift cam 163, 165, 167, 169, 171, 173, and 175 are formed by plate cams, are provided on outer peripheries with cam faces explained later, and are rotationally driven integrally with the cam shaft 161 according to shift instruction. An electric shift motor 890 is connected to the cam shaft 161. Instead of the shift motor 890, it is possible to use an actuator such as hydraulic pressure, air pressure, an electromagnetic solenoid or the like. Instead of the shift motor 890, an operation lever for manual operation may be used.

FIG. 9 representatively indicates the rocker arm 159 and the cam set 151 to operate the 3rd meshing clutch 51. The rocker arms 155, 157 and the cam sets 147, 149 to operate the 1st and the 2nd meshing clutches 47, 49 are, however, similar thereto. Although the rocker arm 153 and the cam set 145 to operate the reverse idler 42 are also basically similar thereto, there is no need for sub-cams explained later for the shift cam of the cam set 145, and they are not provided.

In the cam set 151, a pair of the shift cams 173, 175 are arranged on both sides of the rocker arm 159 in the axial direction. The shift cams 173, 175 take 2 speeds or more away from each other. The shift cams 173, 175 commonly uses the corresponding rocker arm 159, and the respective shift cams 173, 175 concern in swinging operation of the single rocker arm 159. The respective shift cams 173, 175 integrally rotate according to the rotation of the cam shaft 161, and concern in the shift guiding of the 4th and the 6th shift stages, respectively in the present embodiment.

A play (L1>L2) indicated in FIG. 9 and FIG. 10 is defined by L1 which is a distance between pins 159a, 159b and L2 which is an inter-outer edge dimension between the shift cams 173, 175 of the cam set 151 between the pins 159a, 159b. Namely, the play (L1>L2) is formed between the cam faces of the shift cams 173, 175 of the cam set 151 and the pins 159a, 159b of the rocker arm 159 in a swinging direction. The shift cam 173 concerns in the shift guiding of the rocker arm 159 to the 4th speed. The shift cam 175 concerns in the shift guiding of the rocker arm 159 to the 6th speed. The other shift stages are similar thereto.

The play (L1>L2) makes the shift fork 87 free within a range of the play, and allows the clutch sleeve 63 to axially move between the 1st and the 2nd meshing positions. With this, the torque transmission is surely possible in both drive and coast directions.

Shift operation of the reverse idler 42 and shift operation of the 1st-3rd meshing clutches 47, 49, 51 are performed by the rocker arms 153, 155, 157, 159 and the cam sets 145, 147, 149, 151. In this case, the shift mechanism 800 sets shift strokes for the axial movements of the clutch sleeve of the upper shift stage and the clutch sleeve of the lower shift stage in order to change the connection from the lower shift stage to the upper shift stage. In this setting of the shift strokes by the shift mechanism 800, it is larger at the time of the shift-down to the lower stage than at the time of the shift-up to the upper stage according to the structure of the shift cam. The shift stroke at the time of the shift-up may be the same as the shift stroke at the time of the shift-down. The setting of the shift strokes will be explained later.

With reference to FIG. 11, the shift cam 175 for the 6th speed of the cam mechanism CA4 of the 4th speed and the 6th speed will be representatively explained. The structures of the other shift cams for the cam mechanism CA2 of the 1st speed and the 3rd speed and of the cam mechanism CA3 of the 2nd speed and the 5th speed are similar thereto.

A hexagonal hole 175a is formed at an axial center portion of the shift cam 175, the hexagonal hole 175a fits a circumferential face having a hexagonal sectional shape of the cam shaft 161 of FIG. 8, they are possible to rotate integrally. It should be noted that the integrally rotating structure of the shift cam 175 with respect to the cam shaft 161 may employ a known structure such as a spline and a key.

In addition, the shift cams 165, 167, 175, 173, 171, 169 of the 1st speed, the 3rd speed, the 6th speed, the 4th speed, the 5th speed, the 2nd speed from the right, and the shift cam 163 of the reverse at the rightmost in FIG. 8 are attached to the cam shaft 161 while shifting phases.

A circumferential face of the shift cam 175 forms the cam face 175b. The pins 159a, 159b of the rocker arm 159 slide on the cam face 175b so that the rocker arm 159 swings to perform the shift operation.

On a top face of the shift cam 175, a pair of stopper faces 175c, 175d are formed in stepped shapes. In a stepped portion on the top face of the shift cam 175, a sub-cam 174 is rotatably supported with a shaft 176. To the sub-cam 174, a contact edge portion 174a facing the stopper faces 175c, 175d is formed on one side, and an outer edge portion 174b is formed to follow part of the cam face 175b.

The sub-cam 174, therefore, rotates around the shaft 176 so that the contact edge portion 174a is allowed to come into contact with any one of the stopper faces 175c, 175d with switching.

The outer edge portion 174b of the sub-cam 174 is provided with a projection portion 174c. In the sub-cam 174, the outer edge portion 174b follows the cam face 175b so that the projection portion 174c involves a projection portion 175e of the shift cam 175. The projection portion 175e and 174c set the shift strokes according to setting of heights thereof.

Namely, the projection portion 174c of the sub-cam 174 overlaps the projection portion 175e of the shift cam 175 when the sub-cam 174 rotates in one side to bring the contact edge 174a into contact with the stopper face 175c as illustrated in FIG. 11(A). At this time, a common rotational radius of front ends of the projection portions 175e, 174c is R1.

As illustrated in FIG. 11(B), the projection portion 174c of the sub-cam 174 radially protrudes from the projection portion 175e of the shift cam 175 when the sub-cam 174 rotates in the other side to bring the contact edge 174a into contact with the stopper face 175d. At this time, a rotational radius of the front end of the projection portion 174c is R2. A relation between the rotational radii R1, R2 is R1<R2. With the relation of the rotational radii R1<R2 on the shift cam 175 side, the shift-down to the lower stage is larger in the shift stroke than the shift-up to the upper stage by ΔY. The ΔY corresponds to the distance ΔX between the 1st meshing position and the 2nd meshing position.

It should be noted that no special projection may be formed to the shift cam 175 and the relation of the rotational radii R1, R2 may be established by the projection 174c of the sub-cam 174 only.

As illustrated in FIG. 12, the rocker arm 159 is provided with the pins 159a, 159b on two sides. The pin 159a is guided by the cam face of the shift cam 175 on the 6th speed side. The pin 159b is guided by the cam face of the shift cam 173 on the 4th speed side. Namely, the pins 159a, 159b are arranged separately on the front and the back on both right and left sides when the rocker arm 159 is viewed from the front.

On a central portion of the rocker arm 159, a hole 159c is formed in an arc shape to be loosely fitted to the cam shaft 161. A front end portion of the rocker arm 159 is provided with an operation portion 159d and engages with the engaging part 141 of the shift arm 815. The rocker arm 159 is swingably and rotatably supported to the housing 143 with a pivot 159e.

As illustrated in FIG. 1, the torque of the engine is transmitted to the main shaft 3 through a starting clutch 2. Explaining with the 4th shift stage, the torque is transmitted to the 4th gear 25 from the main shaft 3 through the clutch hub 57, and the clutch sleeve 63. The 4th gear drives the gear 37. The gear 37 drives the counter shaft 5, and power is transmitted to wheels through the gear 93, the reduction gear 212R, the differential device (not illustrated), and axle shafts. When the clutch sleeve 63 is in the neutral position (neutral) of the 4th gear 25 and the 6th gear 29 on both sides, the meshing of the 3rd meshing clutch 51 is released not to transmit the power.

As explained above, when the shift stage of the 4th speed is connected, the drive-meshing faces 119 of the clutch sleeve 63 mesh with the drive-meshing faces 101 of the 4th gear 25 to perform the transmission of the driving torque in response to input of the driving torque from the engine as illustrated in FIG. 3(A). The meshing at this time is performed at the 2nd meshing position in the meshing teeth 51a, 25a distancing away by ΔX according to the function of the moving-guide face 101a.

On the other hand, the clutch sleeve 63 relatively rotates from the position of FIG. 3(A) toward the coast-meshing faces 99 in response to the generation of the coasting torque of the engine as illustrated in FIG. 3(B). At this time, the drive-meshing faces 119 of the meshing teeth 51a are released from the meshing with respect to the drive-meshing faces 101 of the meshing teeth 25a. With the releasing of the meshing, the clutch sleeve 63 moves in the left direction in the drawing according to the urging force of the urging mechanism 1000. With this movement, the meshing teeth 51a move to the bottoms of the meshing teeth 25a. At the movement position, the coast-meshing faces 113 of the meshing teeth 51a mesh with the coast-meshing faces 99 at the 1st meshing position.

The axial movement of the clutch sleeve 63 according to change of the torque direction is not dependent on the shift mechanism 800 and is autonomously performed by the function of the urging mechanism 1000 and the moving-guide faces 101a. In this state, since the play (L1>L2) is formed between the rocker arm 159 and the cam set 151 of the shift mechanism 800 as mentioned above, smooth operation of the clutch sleeve 63 is achieved. The autonomous operation of the clutch sleeve 63 according to the function of the urging mechanism 1000 and the moving-guide faces 101a needs no force to the clutch sleeve 63 using the shift fork 87, and wear of the clutch sleeve 63 and the shift fork 87 is suppressed.

The urging mechanism 1000 of the present invention embodiment allows the axial force to be set larger since the inclined groove portions 460 of the clutch sleeve 63 directly receives the axial force from the balls 824 in the same axial direction. In addition, the urging force of each coil spring 822 arranged in the radial direction and radial force based on centrifugal force of the ball 824 are received with the inclined groove portion 460 to be canceled with each other. Accordingly, harmful friction is not caused or is suppressed between the sliding portion between the clutch hub 57 and the clutch sleeve 63.

If engine revolution becomes higher, faster axial movement of the clutch sleeve 63 is required since sliding resistance of the engine, pumping loss and the like are increased to change the driving torque to the coasting torque faster at the time of closing a throttle valve.

On the other hand, if the revolution of the engine increases and the revolution of the clutch sleeve 63 increases, the ball 824 and the coil spring 822 (centrifugal force of liquid or the like in the supporting hole 620 in the case that the urging force is generated by the hydraulic pressure) increases in proportion to a square of the revolution of the clutch sleeve 63. Accordingly, the axial force to push the clutch sleeve 63 also increases as increase of the revolution of the engine. Namely, even if the revolution of the engine is high, the axial movement of the clutch sleeve 63 accurately follows the change of the torque direction. As a result, it is possible to perform the accurate torque transmission.

When changing the connection from the lower stage to the upper stage, the shift mechanism 800 performs shift driving at the time of generation of an appropriate slide if, for example, coupling force of the start clutch 2 is weaken so that output transmission torque of the starting clutch 2 is equated with the coasting torque.

The shift mechanism 800 timely operates by that a controller controls the motor driving and the like according to operation of the shift lever or accelerating work. For example, if the shift-up is performed from the 4th speed to the 5th speed, the clutch sleeve 61 of the upper stage and the clutch sleeve 63 of the lower stage are operated through the shift arms 813, 815, the shift rods 805, 807, the shift forks 85, 87.

The clutch sleeve 63 rotates faster than the 4th gear 25 according to a difference between the upper stage and the lower stage in gear ratio at the same time that the meshing teeth 49b of the clutch sleeve 61 mesh with the meshing teeth 27a of the 5th gear 27 of the upper stage. Accordingly, the meshing teeth 51a of the clutch sleeve 63 relatively rotate toward the coast-meshing faces 99 in the meshing teeth 25a of the 4th gear 25, to release the meshing with the drive-meshing faces 101, 119.

At this time, the clutch sleeve 63 receives the urging toward the bottoms of the meshing teeth 25a according to the urging of the urging mechanism 1000. The movement of the rocker arm 159 is, however, regulated by the cam face 173b of the shift cam 173 of the 4th gear 25 of the lower stage that rotate to be interlocked with the rotation of the shift cam 171 of the 5th gear 27 of the upper stage, and the meshing teeth 51a floating from the meshing teeth 25a by ΔX in the 2nd meshing state is maintained as they are.

At this time, the shift mechanism 800 covers only the function to maintain the state in which the clutch sleeve 63 distances away to the 2nd meshing position as it is. Accordingly, the shift mechanism 800 does not need to drive the clutch sleeve 63 to be forcibly floated from the 1st meshing position to the 2nd meshing position and the shift mechanism 800 is prevented from being worn and energy wasting.

When the clutch sleeve 63 rotates faster than the 4th gear 25, the tooth tops 113 of the meshing teeth 51a are in the axial position capable of coming contact with the releasing-guide faces 97 at the 2nd meshing position distanced away from the bottoms of the meshing teeth 25a by ΔX.

Accordingly, the tooth tops 113 come into contact with the releasing-guide faces 97 according to the relative rotation of the meshing teeth 51a, 25a so that the axial force acts on the tooth tops 113 with the inclined face function in a neutral direction (a direction for releasing the clutch). On the other hand, since the play (L1>L2) that does not hinder the movement of the clutch sleeve 63 to the neutral position is provided between the cam set 151 and the pins 159a, 159b of the rocker arm 159 in relation to the shift cam 173 of the lower stage of the shift mechanism 800 as mentioned above, the meshing teeth 51*a* and the clutch sleeve 63 of the lower stage autonomously move to the neutral position with the inclined face effect. Then, the meshing teeth 49*b* of the clutch sleeve 61 of the upper stage and the meshing teeth 27*a* of the 5th gear 27 are settled in the given meshing position and the shifting to the upper stage is completed.

Generally, a seamless-shift transmission of this kind causes simultaneously meshing of a lower shift stage and an upper shift stage in a short time at the time of shifting to the upper stage. Internal circulation torque accompanying with the simultaneously meshing stores potential energy for twisting on a main shaft 3 and the like, and noise is generated by energy releasing at the time of releasing of a 3rd meshing clutch 51 of the lower stage.

According to the embodiment of the present invention, magnitude of the internal circulation torque is equal to magnitude Ti of the coasting torque of the meshing teeth 25*a*, 51*a* of the lower speed side of the lower stage. The magnitude of the torque Ti is determined by accelerating resistance of total mass M of the meshing teeth 51*a*, the clutch sleeve 63 and the shift fork 87 interlocked therewith and the like on the shift mechanism side in the axial direction and by frictional resistance of the spline between the meshing teeth 25*a*, 51*a* and the clutch hub 57 and the clutch sleeve 63.

Where, if an angle between the tooth top of the meshing tooth 25*a* and the rotational axis of the releasing-guide face 97 is $\theta$ and a constant of proportionality is K, the accelerating resistance Fa based on the mass M in the axial direction is $Fa=K*M*\cot\theta$ and component force Fx of the accelerating resistance Fa in the rotational direction that is a factor determining Ti is $Fx=Fa*\cot\theta=K*M*(\cot\theta)2$.

The internal circulation torque Ti is, therefore, in proportion to a square of $\cot\theta$ and becomes steeply smaller as $\theta$ becomes larger. As a result, the potential energy for the shaft twisting becomes smaller to reduce the noise at the time of the releasing.

Further, if difference in rotational speed of the meshing teeth 25*a*, 51*a* at clutch radius portions is $\Delta V$, an axial speed component Vth of the meshing tooth 51*a* is $Vth=\Delta V*\cot\theta$ and becomes smaller as $\theta$ becomes larger. Then, the axial speeds of the clutch sleeve 63 and the shift fork 87 and the like on the shift mechanism side continued thereto are reduced. Since kinetic energy is in proportion to a square of Vth, collision noise of the shift fork 87 and the like on the shift mechanism is reduced as $\theta$ becomes larger.

As mentioned above, it is advantageous for the noise as $\theta$ is larger, namely the inclination of the releasing-guide face 97 in the rotational direction is gentler. The inclination of the releasing-guide face 97 is, however, determined in view of the shifting to the lower stage, and the magnitude thereof is in the above given range.

In the change of the connection to the lower shift stage, the starting clutch 2 is cut off, the meshing of the 2nd meshing clutch 49 of the upper stage with respect to the 5th gear 27 is released to move the 2nd meshing clutch to the neutral position, and then the 3rd meshing clutch 51 of the lower stage is meshed with the 4th gear 25 similarly to a normal manual transmission.

At this time, there is a risk that, if $\cot\theta$>frictional coefficient is not met, the tooth tops 113 are blocked by the inclined faces of the releasing-guide faces 97 according to the friction between the tooth tops 113 of the meshing teeth 51*a* and the releasing-guide faces 97 not to cause the relative rotation between the meshing teeth 51*a*, 25*a* in relation to the above-mentioned inclination $\theta$ of the releasing-guide face 97. Thus, $\theta$ is set in the range larger than 45 degrees to make $\cot\theta$ larger than the frictional coefficient between the tooth tops 113 of the meshing teeth 51*a* and the releasing-guide faces 97.

Figure 13:
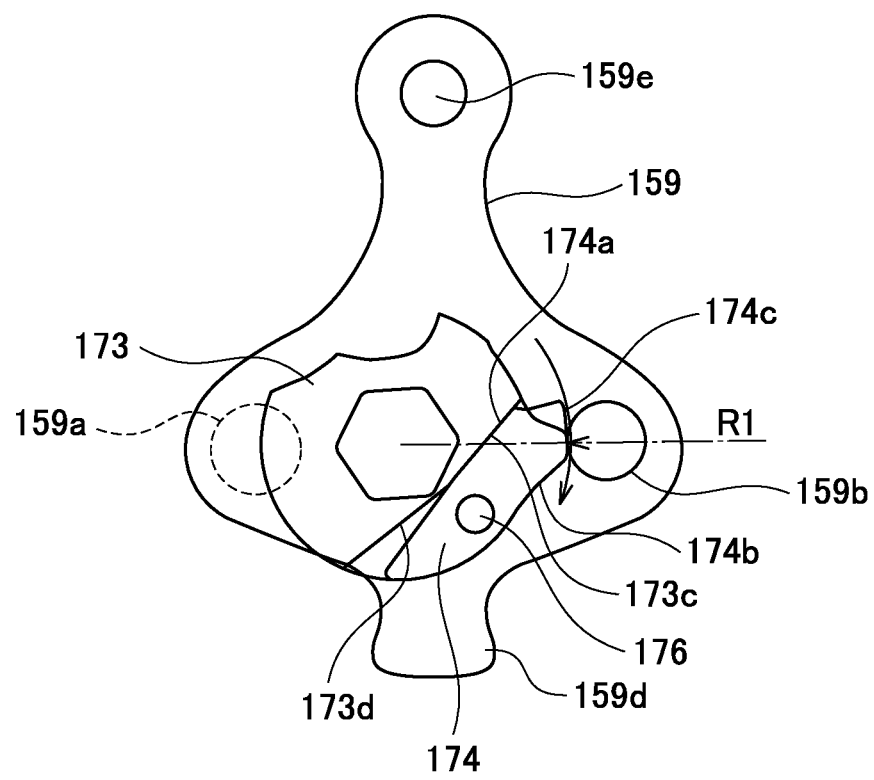
FIG. 13 is a front view illustrating a relation between the rocker arm at the time of the shift-up and the shift cam before the sub-cam operating according to the embodiment 1.
Figure 14:
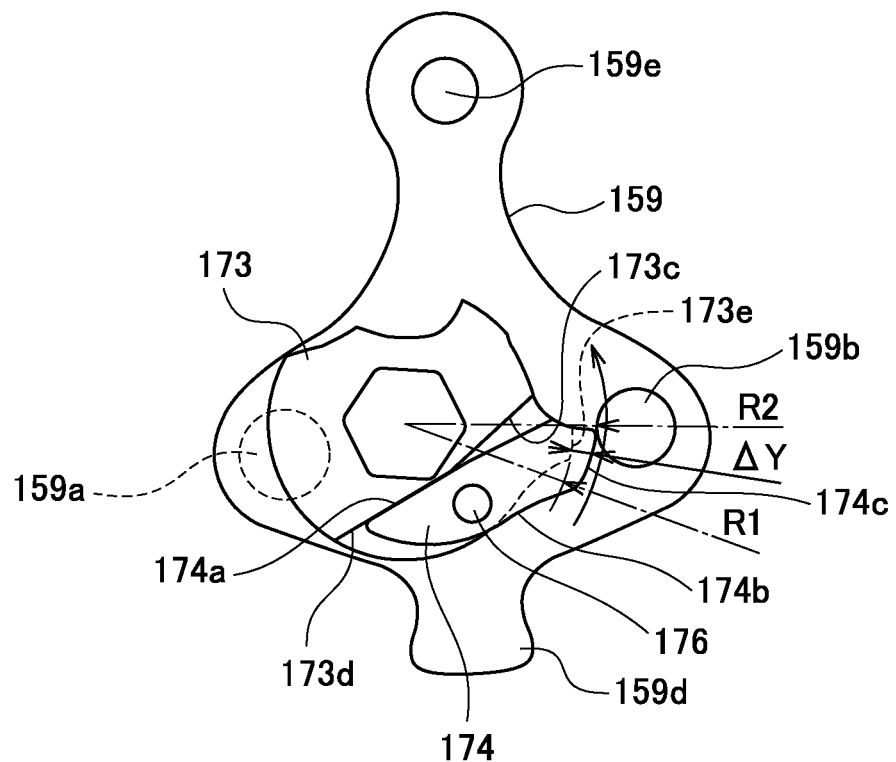
FIG. 14 is a front view illustrating a relation between the rocker arm at the time of the shift-down and the shift cam after the sub-cam operating according to the embodiment 1.

FIG. 13 is a front view illustrating the relation between the rocker arm at the time of the shift-up and the shift cam before the sub-cam operating. FIG. 14 is a front view illustrating the relation between the rocker arm at the time of the shift-down and the shift cam after the sub-cam operating. In addition, there is no difference in the shift stroke at the time of the shift-up and the shift-down for the 6th speed, and explanation will be made between the 5th speed and the 4th speed.

As illustrated in FIG. 9, FIG. 13, and FIG. 14, the two pins 159*a*, 159*b* are driven by the rotation of the shift cams 173, 175, and the rocker arm 159 swings around the pivot 159*e*. Corresponding to the play (L1>L2) between the pins 159*a*, 159*b* and the cam set 149, the clutch sleeve 63 is allowed to freely move in the play.

As illustrated in FIG. 13, when the shift cam 173 for the 4th speed rotates for the shift-up, the sub-cam 174 comes into contact with the stopper face 173*c* and the projection portion 174*c* of the sub-cam 174 overlaps the projection portion 173*e* of the shift cam 173. At this time, the common rotational radius of the front ends of the projection portions 173*e*, 174*c* is R1.

As illustrated in FIG. 14, when the shift cam 173 rotates in the reverse direction for the shift-down, the sub-cam 174 rotates toward the other side so that the contact edge 174*a* comes into contact with the stopper face 173*d*. With the contact, the projection portion 174*c* of the sub-cam 174 radially protrudes from the projection portion 173*e* of the shift cam 173. At this time, the rotational radius of the front end of the projection portion 174*c* is R2.

The rocker arm 159, therefore, swings around the pivot 159*e* at the time of the shift-down to the lower stage more than at the time of the shift-up to the upper stage by $\Delta Y=R2-R1$.

Accordingly, the shift rod 807 and the shift fork 87 of FIG. 1 interlocked with the operation portion 159*d* of the rocker arm 159 move the clutch sleeve 63 to be meshed at the time of the shift-down more than at the time of the shift-up by $\Delta Y$ ($\Delta X$). With the movement to be meshed, the meshing teeth 25*a*, 51*a* of the 4th speed deeply mesh at the time of the shift-down to the 4th speed from the 5th speed.

Even if the starting clutch 2 is not connected at the time of the shift-down, the clutch sleeve 63 may rotate slower than the 4th gear 25 according to the gear ratio and the inertia of the gear. In this case, the speed component in the direction releasing the meshing is loaded to the tooth tops 113 of the meshing teeth 51*a* of the clutch sleeve 63 according to the releasing-guide faces 97 of the meshing teeth 25*a*. If rotational difference is large, only the urging force of the urging mechanism 1000 may not apply acceleration while canceling the speed component to move the meshing teeth 51*a* up to the bottoms of the next teeth of the counterpart meshing teeth 25*a*. Then, the difference in the shift stroke at the time of the shift-down and the shift-up is provided in addition to the urging mechanism 1000 to surely send the tooth tops 113 of the meshing teeth 51*a* up to the bottoms of the meshing teeth 25*a*.

It should be noted that, in a case that the coast-meshing faces 99 of the 3rd meshing clutch 51 may be set to be inclined in a coast rotation direction and the coast-meshing faces 115 may be set to be inclined correspondingly, the coasting torque acts to generate axial thrust to separate the meshing teeth 51*a* from the meshing teeth 25*a*. The thrust may be calculated from the inclination angles of the tooth planes of the coast-meshing faces 99, 115, the tooth planes, and the frictional coefficient between the clutch sleeve 63 and the clutch hub 57 and the like.

The inclinations of the coast-meshing face 115, 99 of the meshing teeth 51a, and the meshing teeth 25a are set in angles to sufficiently suppress movement in the direction to separate the meshing teeth 51a from the meshing teeth 25a according to the urging force of the urging mechanism 1000 on the basis of the thrust generated when acting normal coasting torque (torque due to the engine braking). The angles may be determined on the basis of the calculation or the like.

Unexpected large coasting torque is momentarily and impactedly applied according to the axial thrust generated on the tooth planes of the meshing teeth 25a, 51a exceeding the thrust of the urging mechanism 1000. At this time, although the meshing of the meshing teeth 25a, 51a may be momentarily released, the meshing of the meshing teeth immediately return to the normal meshing position with the urging force of the urging mechanism 1000.

Further, even if it causes a situation that a breakdown on the shift system is caused and the meshing tooth 51a of the lower stage is not kept to be floated from the meshing teeth 25a by ΔX, a breakdown mode is improved. Namely, the meshing of the meshing teeth 25a, 51a of the lower stage is released before the gears 25, 27 and the like are damaged due to large internal circulation torque based on the simultaneously meshing of the upper and the lower stages. Further, even if such the situation is caused, it keeps on travelling using the meshing clutch of the upper stage.

Figure 15:
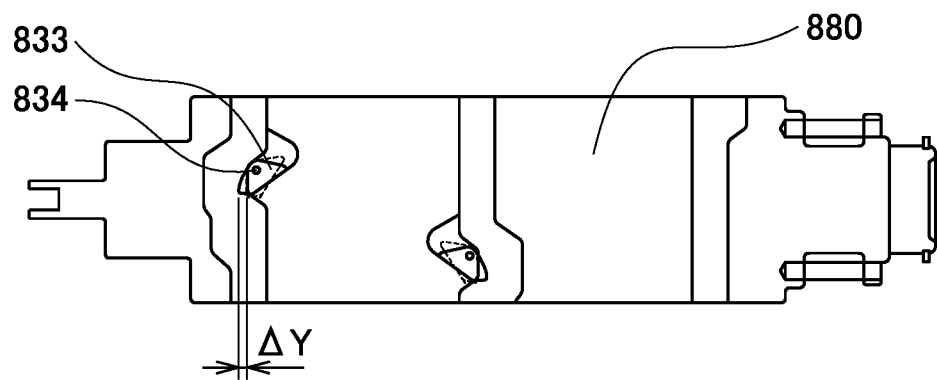
FIG. 15 is an explanatory view of application of a sub-cam to a shift drum according to a modification example of the shift mechanism according to the embodiment 1.
Figure 16:
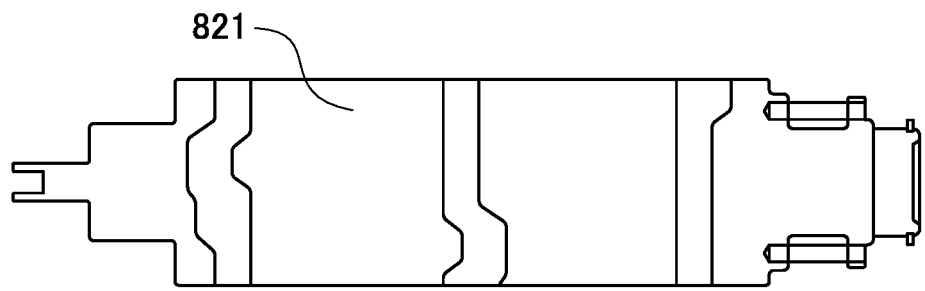
FIG. 16 is an explanatory view illustrating an example of a shift drum replacing with the rocker arm and the shift cam according to a modification example of the shift mechanism according to the embodiment 1.
Figure 17:
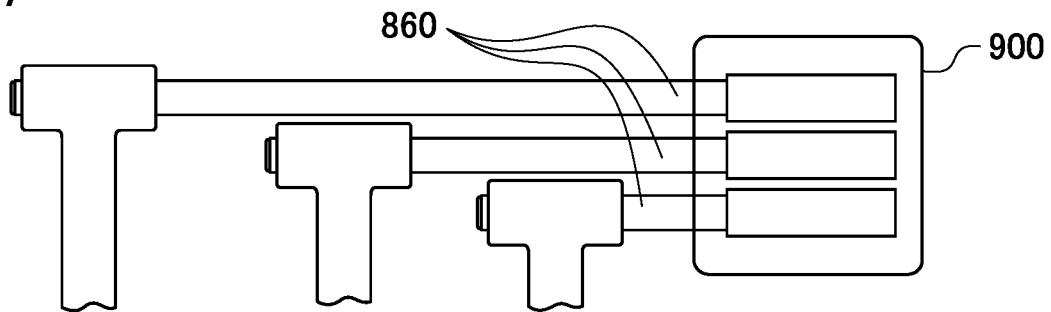
FIG. 17 is an explanatory view illustrating an example of a shift actuator replacing with the rocker arm and the shift cam according to a modification example of the shift mechanism according to the embodiment 1.

FIG. 15 is an explanatory view of application of a sub-cam to a shift drum according to a modification example of a shift mechanism. FIG. 16 is an explanatory view illustrating an example of a shift drum replacing with the rocker arm and the shift cam according to a modification example of the shift mechanism. FIG. 17 is an explanatory view illustrating an example of a shift actuator replacing with the rocker arm and the shift cam according to a modification example of the shift mechanism.

The shift mechanism 800 is sufficient to independently drive the shift rods, and may employ one of FIG. 15 configured so that sub-cams 833 are rotatably supported with a shift drum 880 with shafts 834 to protrude and retract relatively to grooves for shifting within a range of ΔY, one configured by a rotatable drum 821 as illustrated in FIG. 16, and one configured by an actuator 900 using any one or a combination of electromotion, hydraulic pressure, and air pressure to separately drive shift rods 860 as illustrated in FIG. 17.

Figure 18:
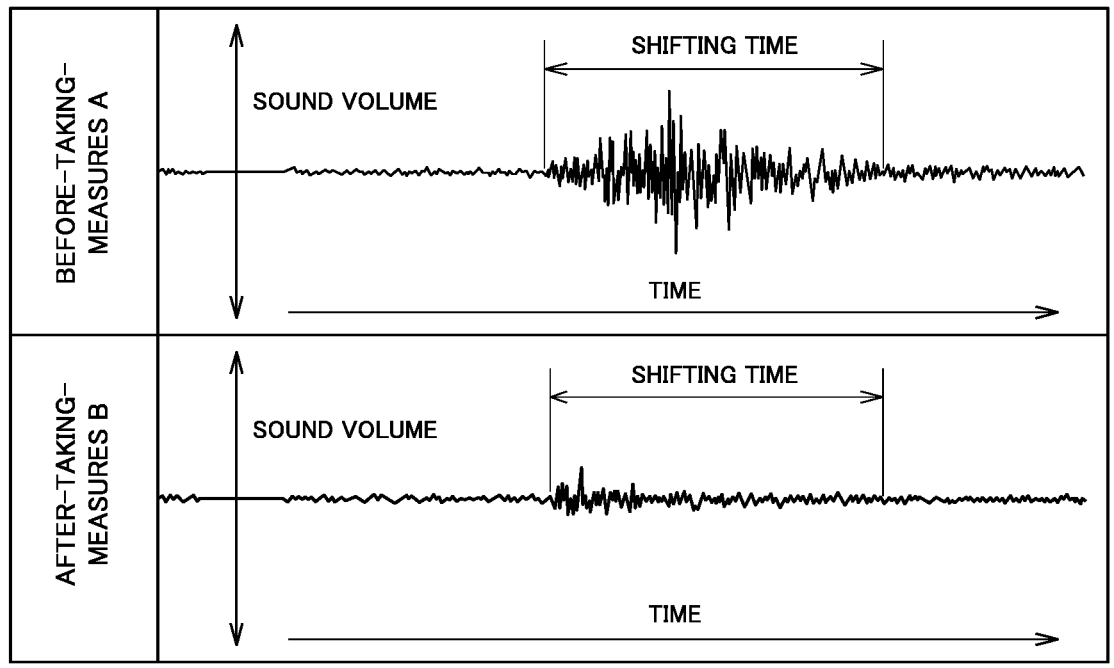
FIG. 18 is a graph illustrating comparison between the embodiment (after-taking-measures B) and a comparative example (before-taking-measures A) in generation of noise according to the embodiment 1.
Figure 19:
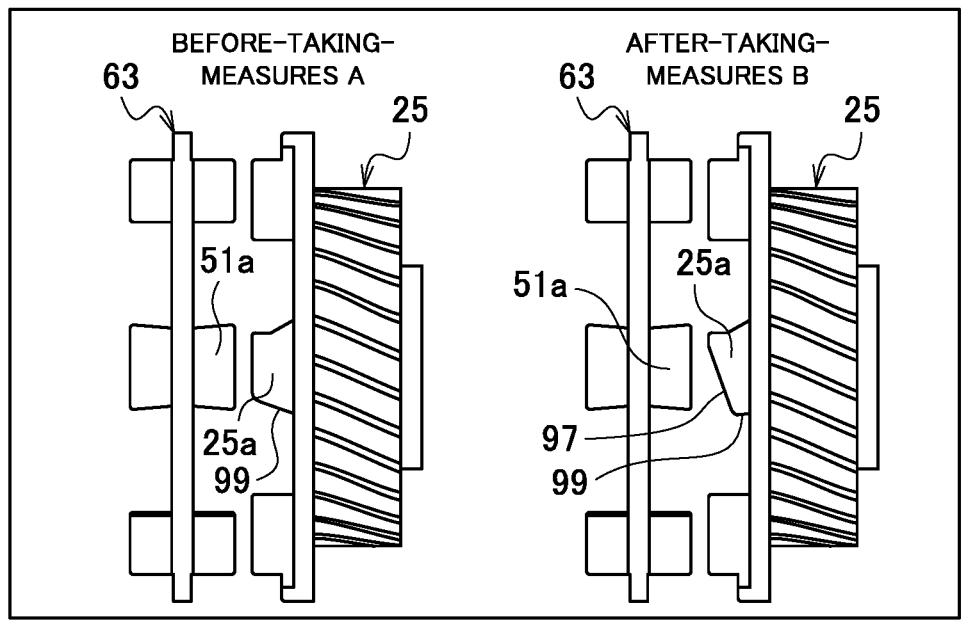
FIG. 19 is an explanatory view illustrating the embodiment (after-taking-measures B) and the comparative example (before-taking-measures A) according to the embodiment 1.

FIG. 18 is a graph illustrating comparison between the embodiment (after-taking-measures B) and a comparative example (before-taking-measures A) in generation of noise. FIG. 19 is an explanatory view illustrating the embodiment (after-taking-measures B) and the comparative example (before-taking-measures A).

FIG. 18 is comparative experimental data between the before-taking-measures A and the after-taking-measures B of FIG. 19, the after-taking-measures B employs the meshing clutch of the above-mentioned embodiment for a seamless-shift transmission. Namely, the after-taking-measures B is provided with the releasing-guide faces 97 on the tooth tops of the meshing teeth 25a and the coast-meshing faces 99 at the bottoms. The before-taking-measures A is provided with tooth tops of meshing teeth 25a being flat in the rotational direction, coast-meshing faces 99 being inclined faces, and is not provided with the releasing-guide faces on the tooth tops.

Experimental condition is as follows.

Practical vehicle measurement is performed while accelerating and shifting on a chassis dynamometer. Sound measurement is performed by a microphone put right above the transmission. Displacement measurement is performed by a gap sensor put on the lower stage sleeve inside the transmission. A roller chassis dynamometer is used as an experimental instrument. Measurement instruments are DR-7100 portable recorder made by ONO SOKKT CO., LTD used as a data recorder, MI-1235 microphone for measurement and MI3111 preamplifier made by ONO SOKKT CO., LTD used for the sound measurement, and electronic application PU-05 gap sensor and AEC-55 converter used for the displacement measurement.

In the graph of FIG. 18, an abscissa indicates change in time in each of the before-taking-measures A and the after-taking-measures B. Sound volume is indicated in an ordinate. Displacement when the clutch sleeves of the upper stage and the lower stage simultaneously mesh and the clutch sleeve of the lower stage moves to be released from the meshing position as mentioned above is measured as displacement of the lower gear, although it is not indicated in FIG. 18.

In comparison between the before-taking-measures A and after-taking-measures B, the lower stage gear displacement of the before-taking-measures A is rapid in meshing-releasing operation with absence of guiding at releasing-guide faces whereas that of the after-taking-measures B is relatively gentle displacement according to the guiding at the releasing-guide faces. Thereafter, the lower stage gear of the before-taking-measures A largely vibrates on a releasing side whereas the lower stage gear of the after-taking-measures B involves small vibration.

As a result, as illustrated in FIG. 18, in the generation of the noise in the meshing-releasing operation, the after-taking-measures B is clearly smaller than the before-taking-measures A in sound volume.

With the difference, the after-taking-measures B greatly reduces the noise at the time of the shifting with respect to the before-taking-measures A, prevents the shift mechanism from being worn as a result, and enables surely and smoothly shifting.

Moreover, there is no need for holes of a gear case, screws, and v-shaped grooves of the shift forks for a shift position checking mechanism, and the structure is simplified to contribute cost reduction. Further, it is normally necessary for large backlash and a combination of high and low teeth in order to mesh the meshing teeth 27a, 49b according to the relative rotation of the clutch sleeve 61 and the 5th gear 27 at the time of the shift-up from the 4th speed to the 5th speed for example. In the present embodiment, the clutch sleeve 61 gains, however, the axial speed component in the meshing direction by the tooth tops 421 of the meshing teeth 49b advancing along the inclined faces of the releasing-guide faces 245.

Accordingly, the backlash at the time of the meshing is reduced while using the meshing teeth 49b, 27a having the same height. As a result, it prevents from shift error and noise according to the backlash reduction in functionality in addition to the reduction of the manufacturing cost, the noise caused by 3rd vibration.

Figure 20:
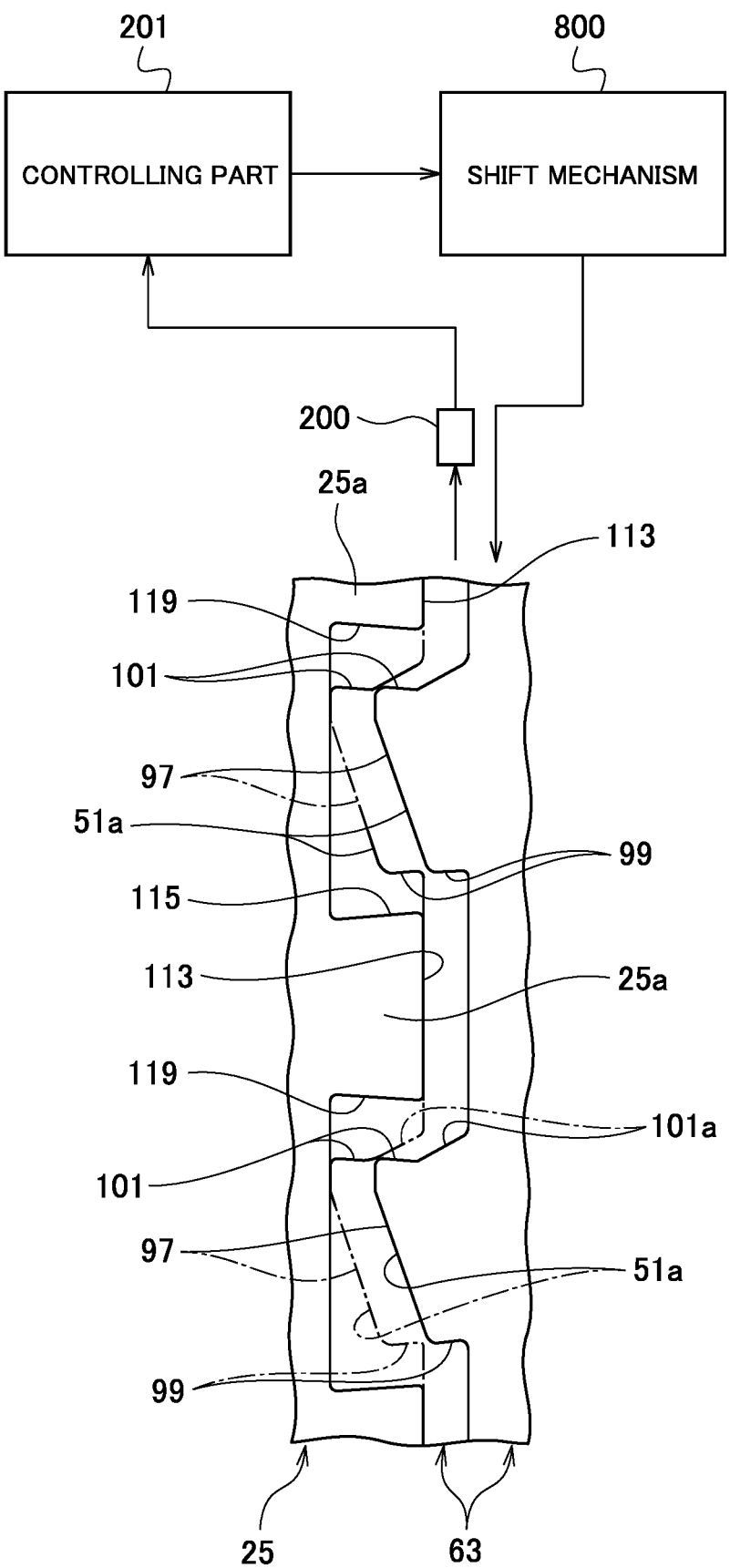
FIG. 20 is a schematic structural view of a system to perform shifting cancel according to an embodiment 2 of the present invention.
Figure 21:
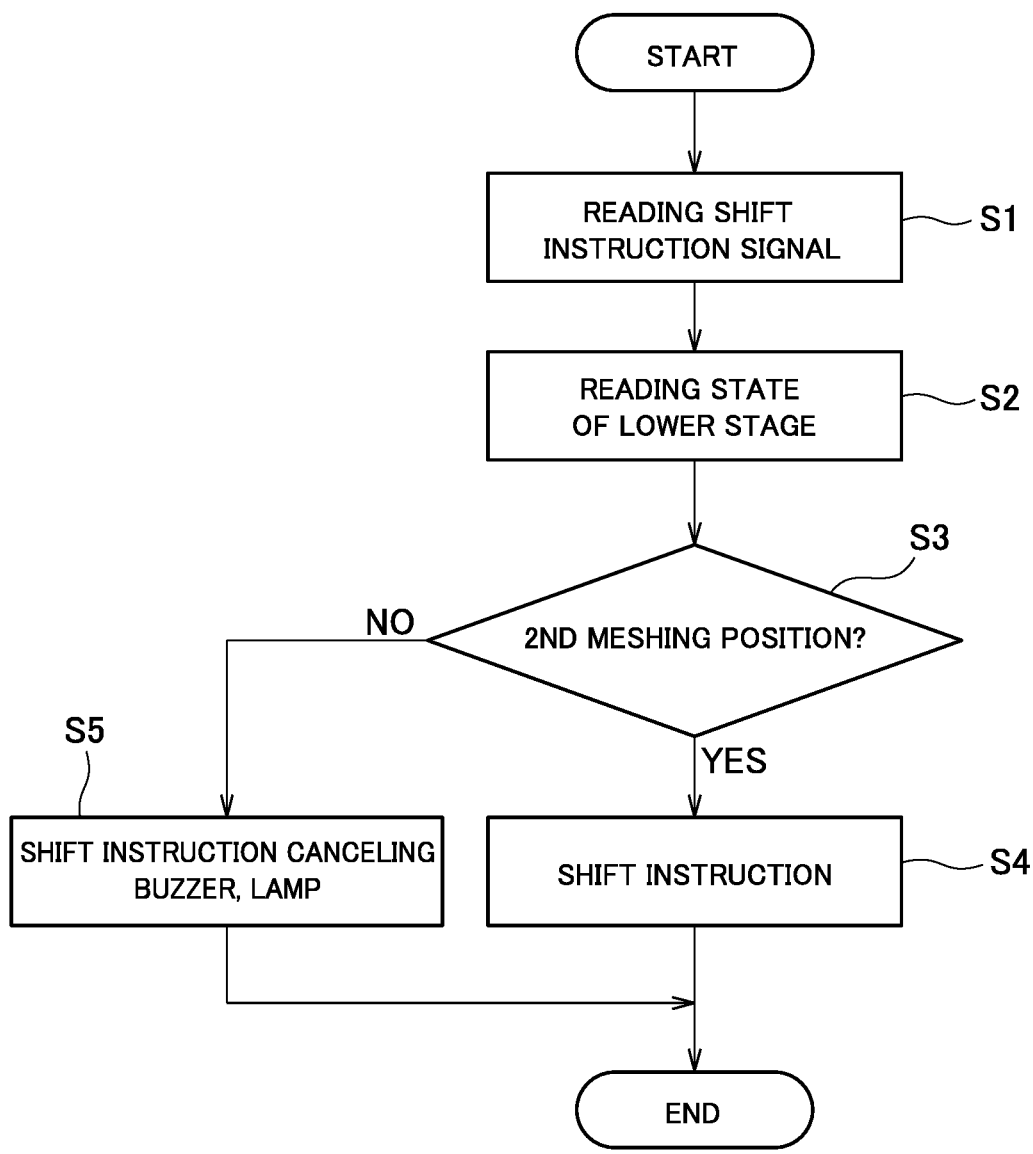
FIG. 21 is a flow chart for performing the shifting cancel according to the embodiment 2.

FIG. 20 and FIG. 21 indicate the embodiment 2. FIG. 20 is a schematic structural view of a system to perform shifting cancel. FIG. 21 is a flow chart for performing the shifting cancel.

FIG. 20 indicates behavior of meshing teeth of a lower stage when an upper stage and the lower stage perform simultaneously meshing. For example, a relation between the clutch sleeve 63 and the 4th gear 25 in the 3rd meshing clutch 51 is indicated.

According to the present embodiment, the meshing tooth 51a of the clutch sleeve 63 is provided with the releasing-guide face 97, the drive-meshing face 101, the coast-meshing face 99, and the moving-guide face 101a. The meshing tooth 25a of the 4th gear 25 is provided with the drive-meshing face 119, the coast-meshing face 115, and the tooth top 113. A relation in shape between the meshing teeth 25a, 51a is reversed relatively to the embodiment 1. In addition, a driving direction and a coasting direction in torque transmission are reversely indicated with respect to the above.

In FIG. 20, in a case that the 4th gear 25 is the lower stage at the time of the shift-up, the clutch sleeve 63 originally is the 2nd meshing position according to cooperation of the moving-guide face 101a and the shift mechanism.

As explained in the embodiment 1, when the clutch sleeves of the 4th and the 5th shift stages, therefore, simultaneously mesh, the tooth tops 113 of the meshing teeth 25a are guided by the releasing-guide faces 97 of the meshing teeth 51a in the 4th speed being the lower stage to smoothly release the meshing of the 4th speed and complete the shift-up to the 5th speed.

If the lower shift mechanism is damaged and the clutch sleeve 63 of the lower stage is still in the 1st meshing position, the releasing-guide face 97 is not worked at the time of the simultaneously meshing of the upper stage and the lower stage, and the meshing teeth of the 5th speed of the upper stage while the lower meshing teeth 51a, 25a of the lower stage mesh using the coast-meshing faces 99, 115 to cause doubly meshing.

Then, the shifting is made impossible when the clutch sleeve of the lower stage is in the 1st meshing position.

In addition, although the explanation will be made using the 3rd meshing clutch 51, the other meshing clutches are the same.

As illustrated in FIG. 20, the seamless-shift transmission of the present embodiment is provided with the shift mechanism 800, a detector 200, and a controlling part 201. The shift mechanism 800 forms a shift-diving part to change connection from one shift stage to the other shift stage, and is configured in the same way as the embodiment 1. The detector 200 is a proximity sensor or the like to detect a state of the one shift stage. The detector 200 detects whether the clutch sleeve moves to the 2nd meshing position from the 1st meshing position as the state of the one shift stage. The detection signal is input to the controlling part 201. The controlling part is provided with a MPU, a ROM, a RAM or the like to control the shift mechanism 800 and perform normal shift operation according to accelerator work and the like. Further, if a state of one shift stage is not in the above state, namely the clutch sleeve 63 is not in the 2nd meshing position at which meshing is shallow of FIG. 20, a signal to change connection to the 5th shift stage by the shift mechanism 800 is canceled.

The flow chart of FIG. 21 performs an interruption process in response to input of a shift-up signal based on accelerating work or the like.

A step S1 performs a process of "reading a shift instruction signal" to transition to a step S2. In this process, the controlling part 201 reads the signal for shift instruction according to a signal based on the accelerating work or the like.

The step S2 performs a process of "reading the state of the lower stage" to transition to a step S3. The state of the lower stage is a state that the clutch sleeve 63 of the lower stage moves to the 2nd meshing position if, for example, the shift-up from the 4th speed to the 5th speed is performed. The state is detected by the detector 200 to input the detection signal to the controlling part 201. The controlling part 201 reads the detection signal input.

The step S3 performs a determining process of "the 2nd meshing position?". The determining process compares the read detection signal and a reference signal for the clutch sleeve 63 which should be originally positioned in the 2nd meshing position, they are matched (YES) to transition to a step S4, or they are not matched (NO) to transition to a step S5.

The step S4 performs a process of "shift instruction". The clutch sleeve 63 has moved to the 2nd meshing position, and the releasing-guide faces 97 effectively work according to the relative rotation of the meshing teeth 25a, 51a so that the shift mechanism 800 is allowed to be operated according to the shift instruction. With the operation of the shift mechanism 800, the connection is changed to the upper stage through the simultaneously meshing conducted by the meshing of the clutch sleeve 61 of the upper stage to the 5th gear 27 and contact guiding with the releasing-guide faces 97 with respect to the shift gear 25 of the clutch sleeve 63 of the lower stage.

The step S5 performs a process of "shift instruction canceling". The process prevents the so-called doubly meshing according to defects at the time of the shift-up, and cancels the shift instruction to the shift mechanism 800. Namely, if, for example, the shift instruction from the 4th speed to the 5th speed is conducted as it is as shift instruction to the shift mechanism 800, the coast-meshing faces 99 of the clutch sleeve 63 impact to the coast-meshing faces 115 of the shift gear 25 according to the relative rotation based on the simultaneously meshing when the clutch sleeve 63 of the 4th speed of the shift lower stage is not in the 2nd meshing position. The impact causes the so-called doubly meshing of the upper stage and the lower stage. Accordingly, the shift instruction to the shift mechanism 800 is cancelled if the clutch sleeve 63 of the 4th speed of the shift lower stage is not in the 2nd meshing position, to prevent the doubly meshing. At this time, in the 4th speed of the shift lower stage, the drive-meshing faces 101 of the clutch sleeve 63 mesh with the drive-meshing faces 119 of the 4th gear 25 according to input of the driving torque. With this, travelling with the 4th speed is kept so that the travelling in an emergency is possible. Further, the step S5 buzzes for an alarm and turns on a lamp at the same time of the cancel of the shift instruction, to make a notice to a driver.

In this way, although the transmission performs the simultaneously meshing at the time of the shift-up, it prevents the transmission from doubly meshing and being damaged.

The invention claimed is:
1. A transmission comprising:
  a meshing clutch that connects one shift stage with meshing and is released when changing connection to another shift stage through simultaneously meshing, wherein
  the meshing clutch is provided with meshing teeth on one side and on another side to perform the meshing,
  a meshing tooth on the one side is provided on one rotary member being axially movable to perform torque transmission at said one shift stage, and a meshing tooth on the other side is provided on another rotary member to perform the torque transmission between said one rotary member and said another rotary member, the meshing tooth on said another side with which the meshing tooth on said one side meshes due to axial movement of said one rotary member, a releasing-guide part inclined is provided at a tooth top of any one of the meshing teeth on said one side and on said another side to bring a tooth top of a counterpart into contact with the releasing-guide part according to relative rotation to guide the releasing, a moving mechanism generates axial force to move said one rotary member to an axial position at which the contact according to the relative rotation is allowed when the meshing teeth mesh to perform transmission of driving torque, and the moving mechanism releases the axial force according to generation of coasting torque, said one rotary member engages and is axially movably supported with a torque transmission member in a rotational direction, said another rotary member is relatively rotatably supported and is axially unmovably supported with the torque transmission member, an urging mechanism is arranged between said one rotary member and the torque transmission member to urge said one rotary member with force being poorer than the axial force being generated by the moving mechanism so that the meshing teeth mesh due to that said one rotary member moves from a neutral position to said another rotary member, the urging mechanism is provided with a contact body and an urging functional part, the contact body is arranged in a supporting hole formed on the torque transmission member in a radial direction and is urged by the urging functional part toward an inner periphery of said one rotary member, and the inner periphery of said one rotary member is provided with an urging and converting part that receives the contact body being urged in the radial direction by the urging functional part and converts a direction of the urging to the axial direction to urge the axial movement of said one rotary member.

2. The transmission according to claim 1 wherein
the urging and converting part is an inclined groove portion that connects said one rotary member to the torque transmission member through the contact body in the rotational direction.

3. The transmission according to claim 1, wherein
inclination of the releasing-guide part is set with an angle θ over 45° in the rotational direction relative to an axial center direction of the rotary member and cot θ is over frictional coefficient between the meshing teeth of said one side and said other side at the releasing-guide part.

4. The transmission according to claim 1, wherein
said one rotary member is a clutch sleeve,
said another rotary member is a shift gear, and
the relative rotation to guide the releasing is caused by, when clutch sleeves of a lower shift stage and an upper shift stage respectively simultaneously mesh with shift gears of the lower shift stage and the upper shift stage, coasting torque generated on the clutch sleeve of the lower shift stage.

5. The transmission according to claim 1, wherein
the releasing-guide part is spiral-shaped.

6. The transmission according claim 1, wherein
the moving mechanism is a moving-guide part formed to be inclined at a root of the meshing tooth to guide the tooth top of the counterpart and move said one rotary member from a 1st meshing position to a 2nd meshing position, thereby to put said one rotary member in the axial position at which the contact according to the relative rotation is allowed when the meshing teeth mesh to perform the transmission of the driving torque.

7. The transmission according to claim 1, wherein
said one shift stage is an upper stage and said another shift stage is a lower stage,
the transmission further comprises a shift-driving part that change the connection from said one shift stage to said another shift stage, wherein
the shift-driving part sets shift strokes for axial movements of one rotary member of the upper stage of the shift stage and another rotary member of the lower stage of the shift stage in order to change the connection to said other shift stage, and
in the setting of the shift strokes of the shift-driving part, shift-down to the lower stage is larger than shift-up to the upper stage.

8. The transmission according to claim 1, further comprising:
a shift-driving part that changes the connection from said one shift stage to said another shift stage,
a detector that detects the axial position of said one rotary member of said one shift stage, and
a controlling part that cancels the changing of the connection to said another shift stage according to the shift-driving part when the connection is changed to said another shift stage through the simultaneously meshing and when the detected one rotary member is not at an axial position to be moved according to operation of the moving mechanism.

9. A meshing clutch comprising:
meshing teeth on one side and on another side to perform meshing, wherein
a meshing tooth on said one side is provided on one rotary member being axially movable to perform torque transmission, and a meshing tooth on the another side is provided on another rotary member to perform the torque transmission between said one rotary member and said another rotary member, the meshing tooth on said another side with which the meshing tooth on said one side meshes due to axial movement of said one rotary member, a releasing-guide part inclined is provided at a tooth top of any one of the meshing teeth on said one side and on said another side to bring a tooth top of a counterpart into contact with the releasing-guide part according to relative rotation to guide the releasing, a moving mechanism generates axial force to move the one rotary member to an axial position at which the contact according to the relative rotation is allowed when the meshing teeth mesh to perform transmission of driving torque, and the moving mechanism releases the axial force according to generation of coasting torque, said one rotary member engages and is axially movably supported with a torque transmission member in a rotational direction, said another rotary member is rotatably supported and is axially unmovably supported with the torque transmission member, an urging mechanism is arranged between said one rotary member and the torque transmission member to urge said one rotary member with force being poorer than the axial force being generated by the moving mechanism so that the meshing teeth mesh due to that said one rotary member moves from a neutral position to said another rotary member, the urging mechanism is provided with a contact body and an urging functional part, the contact body is arranged in a supporting hole formed on the torque transmission member in a radial direction and is urged by the urging functional part toward an inner periphery of said one rotary member, and the inner periphery of said one rotary member is provided with an urging and converting part that receives the contact body being urged in the radial direction by the urging functional part and converts a direction of the urging to the axial direction to urge the axial movement of said one rotary member and to connect said one rotary member to the torque transmission member through the contact body in the rotational direction.

* * * * *